United States Patent
Wang et al.

(10) Patent No.: US 12,206,848 B2
(45) Date of Patent: Jan. 21, 2025

(54) ENCODER, A DECODER AND CORRESPONDING METHODS RESTRICTING SIZE OF SUB-PARTITIONS FROM INTRA SUB-PARTITION CODING MODE TOOL

(71) Applicant: Huawei Technologies Co., Ltd., Shenzhen (CN)

(72) Inventors: Biao Wang, Shenzhen (CN); Semih Esenlik, Munich (DE); Anand Meher Kotra, Munich (DE); Han Gao, Munich (DE); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 393 days.

(21) Appl. No.: 17/401,865

(22) Filed: Aug. 13, 2021

(65) Prior Publication Data
US 2021/0377532 A1    Dec. 2, 2021

Related U.S. Application Data

(63) Continuation of application No. PCT/CN2020/075323, filed on Feb. 14, 2020.
(Continued)

(51) Int. Cl.
*H04N 19/119* (2014.01)
*H04N 19/132* (2014.01)
(Continued)

(52) U.S. Cl.
CPC ......... *H04N 19/119* (2014.11); *H04N 19/132* (2014.11); *H04N 19/159* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 2008/0175492 A1 | 7/2008 | Han et al. |
| 2012/0269274 A1 | 10/2012 | Kim et al. |

(Continued)

FOREIGN PATENT DOCUMENTS

| | | |
|---|---|---|
| CN | 101641959 A | 2/2010 |
| CN | 104126303 A | 10/2014 |

(Continued)

OTHER PUBLICATIONS

JVET-M1001-v1, Bross, B. et al., "Versatile Video Coding (Draft 4)," Joint Video Experts Team (JVET) of ITU-T SG 16 WP 3 and ISO/IEC JTC 1/SC 19/WG 11, 13th Meeting: Marrakech, MA, Jan. 9-18, 2019, 233 pages. (Year: 2019).*

(Continued)

*Primary Examiner* — Stuart D Bennett
(74) *Attorney, Agent, or Firm* — Conley Rose, P.C.

(57) ABSTRACT

A method of video coding implemented by a coding device includes obtaining block size information of a current block to be coded in an intra sub-partition (ISP) coding mode, determining a partitioning direction based on the block size information, determining, based on the block size information, a number of sub-partitions to which the current block is to be partitioned in the partitioning direction, wherein the sub-partitions are for intra prediction separately with a width of each of the sub-partitions bigger than or equal to 4 or collaboratively by combining at least two of the sub-partitions with a combined width of the at least two sub-partitions bigger than or equal to 4, and coding the sub-partitions.

22 Claims, 13 Drawing Sheets

Related U.S. Application Data

(60) Provisional application No. 62/806,505, filed on Feb. 15, 2019.

(51) Int. Cl.
*H04N 19/159* (2014.01)
*H04N 19/176* (2014.01)

(56) References Cited

U.S. PATENT DOCUMENTS

| | | | |
|---|---|---|---|
| 2013/0136180 A1 | 5/2013 | Yang et al. | |
| 2017/0201747 A1 | 7/2017 | Son et al. | |
| 2017/0251224 A1 | 8/2017 | Lee et al. | |
| 2018/0176596 A1 | 6/2018 | Jeong et al. | |
| 2018/0376137 A1 | 12/2018 | Jun et al. | |
| 2020/0252622 A1* | 8/2020 | Egilmez | H04N 19/60 |

FOREIGN PATENT DOCUMENTS

| | | |
|---|---|---|
| CN | 104683808 A | 6/2015 |
| CN | 108141604 A | 6/2018 |
| CN | 108353166 A | 7/2018 |
| IN | 106664416 A | 5/2017 |
| KR | 20180056597 A | 5/2018 |
| WO | 2018143496 A1 | 8/2018 |

OTHER PUBLICATIONS

JVET-M0102-v5, De-Luxan-Hernandez, S. et al., "CE3: Intra Sub-Partitions Coding Mode (Tests 1.1.1 and 1.1.2)," Joint Video Experts Team (JVET) of ITU-T SG 16 WG 3 and ISO/IEC JTC 1/SC 29/WG 11, 13th Meeting: Marrakech, MA, Jan. 9-18, 2019, 9 pages. (Year: 2019).*

JVET-M0102-v5, De-Luxan-Hernandez, S., et al., "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11, 13th Meeting: Marrakech, MA, Jan. 9-18, 2019, 9 pages.

Santiago De Luxan Hernandez, et al., "CE3: Line-based intra coding mode (Tests 2.1.1 and 2.1.2)," Joint Video Experts Team (JVET) of ITU-T SG 16 WP 3 and ISO/IEC JTC 1/SC 29/WG 11, 12th Meeting: Macao, CN, Oct. 3-12, 2018, JVET-L0076-v2, 9 pages.

B. Wang, et al., "CE3-related: Simplification on Intra sub-partition coding mode," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0186-r1, 6 pages.

Santiago De-Luxan-Hernandez, et al., "Line-Based Intra Prediction for Next-Generation Video Coding," 25th IEEE International Conference on Image Processing, Oct. 7, 2018, 5 pages.

* cited by examiner

ENCODER, A DECODER AND CORRESPONDING METHODS RESTRICTING SIZE OF SUB-PARTITIONS FROM INTRA SUB-PARTITION CODING MODE TOOL

CROSS-REFERENCE TO RELATED APPLICATION

This is a continuation of International Patent Application No. PCT/CN2020/075323 filed on Feb. 14, 2020, which claims priority to U.S. Provisional Patent Application No. 62/806,505 filed on Feb. 15, 2019. The disclosures of the aforementioned applications are hereby incorporated by reference in their entireties.

TECHNICAL FIELD

Embodiments of the present application generally relate to the field of picture processing.

BACKGROUND

Video coding (video encoding and decoding) is used in a wide range of digital video applications, for example broadcast digital television (TV), video transmission over Internet and mobile networks, real-time conversational applications such as video chat, video conferencing, DIGITAL VERSATILE DISC (DVD) and BLU-RAY DISCs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY OF THE DISCLOSURE

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

A first embodiment of the present disclosure is a method of video coding implemented by a decoding device or an encoding device, wherein the method comprises obtaining block size information of a current block, determining a partitioning direction, by which the current block is partitioned into a number of sub-partitions which are used for intra prediction separately with a width of each of the sub-partitions bigger than or equal to 4 or (for intra prediction) collaboratively by combining at least two of the sub-partitions with a combined width of the at least two sub-partitions bigger than or equal to 4, and the number of sub-partitions, based on the block size information, coding sub-partitions of the current block, wherein the coding includes decoding or encoding.

In other words, each of the sub-partitions may be larger than or equal to 4 samples in the horizontal direction when the sub-partitions are separately used for intra prediction. On the other hand, when at least two of the sub-partitions are used collaboratively, i.e. together, for intra prediction, the combined width of the at least two sub-partitions may be bigger than or equal to 4 samples.

The current block may be coded by an intra sub-partition (ISP) coding mode. The ISP mode is a coding tool which divides a luma intra-predicted block vertically or horizontally into several sub-partitions depending on the block size.

The method may further comprise partitioning the current block into the number of sub-partitions according to the number of sub-partitions and the partitioning direction. Particularly, the number of sub-partitions may be 2 or 4, and the direction may be a vertical direction or a horizontal direction.

Determining a number of sub-partitions based on the block size information may be performed according to the following table:

| Block size | Number of sub-partitions |
| --- | --- |
| 4 × 4 | Not divided |
| 4 × 8 and 8 × 4 | 2 |
| All other cases | 4 |

The partitioning direction may be either horizontal or vertical. Each sub-partition may contain at least 16 samples. It should be noted that if an individual sub-partition contains less than 16 samples, then at least two individual sub-partitions may be combined for intra prediction, such that the combined sub-partitions contain at least 16 samples.

Determining a partitioning direction may be performed by reference to the following partitioning direction table:

| Block size | Number of sub-partitions | Partitioning direction |
| --- | --- | --- |
| 4 × 8 | 2 | Horizontal partitioning, i.e. two 4 × 4 sub-partitions |
| 4 × N (N > 8) | 4 | Horizontal partitioning |
| 8 × N (N > 4) | 4 | Horizontal partitioning |

In other words, determining a partitioning direction and the number of sub-partitions based on the block size information may be performed so that the partitioning direction, the sub-partitions and the block size satisfy a relationship shown in the following partitioning direction table:

| Block size | Number of sub-partitions | Partitioning direction |
| --- | --- | --- |
| 4 × 8 | 2 | Horizontal partitioning, i.e. two 4 × 4 sub-partitions |
| 4 × N (N > 8) | 4 | Horizontal partitioning |
| 8 × N (N > 4) | 4 | Horizontal partitioning |

The partitioning direction table may further include:

| Block size | Number of sub-partitions | Partition direction |
| --- | --- | --- |
| 4 × 4 | Not divided | |
| 8 × 4 | 2 | Allow both horizontal and vertical partitioning |
| All other cases allowed in ISP | 4 | Allow both horizontal and vertical partitioning |

The sub-partitions may be intra prediction blocks.

When the coding is an encoding, the partitioning direction may be coded into a bitstream which includes coded data of the current block. When the coding is a decoding, the partitioning direction may be parsed from a bitstream which includes coded data of the current block and information on the partitioning direction.

According to an aspect of the first embodiment, an encoder is provided comprising processing circuitry for carrying out any one of the methods according to the first embodiment.

According to a further aspect of the first embodiment, a decoder is provided comprising processing circuitry for carrying out any one of the methods according to the first embodiment.

According to a further aspect of the first embodiment, a computer program product is provided comprising instructions which, when the program is executed by a computer, cause the computer to carry out any one of the methods according to the first embodiment.

According to a further aspect of the first embodiment, a decoder or an encoder is provided, comprising one or more processors, and a non-transitory computer-readable storage medium coupled to the one or more processors and storing instructions for execution by the one or more processors, wherein the instructions, when executed by the one or more processors, configure the decoder or the encoder, respectively, to carry out any one of the methods according to the first embodiment.

According to a further aspect of the first embodiment, an encoder is provided, comprising a size determining module configured to obtain block size information of a current block, a sub-partition determining module configured to determine a partitioning direction, by which the current block is partitioned into a number of sub-partitions which are used for intra prediction separately with a width of each of the sub-partitions bigger than or equal to 4 or collaboratively by combining at least two of the sub-partitions with a combined width of the at least two sub-partitions bigger than or equal to 4, and the number of sub-partitions, based on the block size information, and a coding module configured to encode sub-partitions of the current block.

Each sub-partition may contain at least 16 samples.

The sub-partition determining module may be configured to determine the partitioning direction by reference to the following partitioning direction table:

| Block size | Number of sub-partitions | Partitioning direction |
| --- | --- | --- |
| 4 × 8 | 2 | Horizontal partitioning, i.e. two 4 × 4 sub-partitions |
| 4 × N (N > 8) | 4 | Horizontal partitioning |
| 8 × N (N > 4) | 4 | Horizontal partitioning |

In other words, the sub-partition determining module may be configured to determine the partitioning direction and the number of sub-partitions based on the block size information so that the partitioning direction, the sub-partitions and the block size satisfy a relationship shown in the following partitioning direction table:

| Block size | Number of sub-partitions | Partitioning direction |
| --- | --- | --- |
| 4 × 8 | 2 | Horizontal partitioning, i.e. two 4 × 4 sub-partitions |
| 4 × N (N > 8) | 4 | Horizontal partitioning |
| 8 × N (N > 4) | 4 | Horizontal partitioning |

The partitioning direction table may further include:

| Block size | Number of sub-partitions | Partition direction |
| --- | --- | --- |
| 4 × 4 | Not divided | |
| 8 × 4 | 2 | Allow both horizontal and vertical partitioning |
| All other cases allowed in ISP | 4 | Allow both horizontal and vertical partitioning |

The coding module may further be configured to encode information on the partitioning direction into a bitstream which includes coded data.

According to a further aspect of the first embodiment, a decoder comprising a size determining module and configured to obtain block size information of a current block, a sub-partition determining module configured to determine a partitioning direction, by which the current block is partitioned into a number of sub-partitions which are used for intra prediction separately with a width of each of the sub-partitions bigger than or equal to 4 or collaboratively by combining at least two of the sub-partitions with a combined width of the at least two sub-partitions bigger than or equal to 4, and the number of sub-partitions, based on the block size information, and a coding module configured to decode sub-partitions of the current block.

Each sub-partition may contain at least 16 samples.

The sub-partition determining module may be configured to determine the partitioning direction by reference to the following partitioning direction table:

| Block size | Number of sub-partitions | Partitioning direction |
| --- | --- | --- |
| 4 × 8 | 2 | Horizontal partitioning, i.e. two 4 × 4 sub-partitions |
| 4 × N (N > 8) | 4 | Horizontal partitioning |
| 8 × N (N > 4) | 4 | Horizontal partitioning |

In other words, the sub-partition determining module may be configured to determine the partitioning direction and the number of sub-partitions based on the block size information so that the partitioning direction, the sub-partitions and the block size satisfy a relationship shown in the following partitioning direction table:

| Block size | Number of sub-partitions | Partitioning direction |
| --- | --- | --- |
| 4 × 8 | 2 | Horizontal partitioning, i.e. two 4 × 4 sub-partitions |
| 4 × N (N > 8) | 4 | Horizontal partitioning |
| 8 × N (N > 4) | 4 | Horizontal partitioning |

The partitioning direction table may further include:

| Block size | Number of sub-partitions | Partition direction |
| --- | --- | --- |
| 4 × 4 | Not divided | |
| 8 × 4 | 2 | Allow both horizontal and vertical partitioning |
| All other cases allowed in ISP | 4 | Allow both horizontal and vertical partitioning |

The coding module may further be configured to parse information on the partitioning direction from a bitstream which includes coded data.

A second embodiment of the present disclosure is a method of video coding implemented by a decoding device or an encoding device, wherein the method comprises obtaining block size information of a current block, determining a number of sub-partitions and at least one partitioning direction, based on a partitioning rule and the block size information, and coding the current block according to the number of sub-partitions and the at least one partitioning direction, wherein the coding includes decoding or encoding.

The number of sub-partitions may be the same as the number of blocks after partitioning a current block. The coding may in particular, include partitioning the current block.

The current block may be coded by an ISP coding mode. The method may further comprise partitioning the current block into sub-partitions according to the number of sub-partitions and the at least one partitioning direction.

The partitioning rule may include partitioning according to the following table:

| Block size | Number of sub-partitions |
| --- | --- |
| 4 × 4 | Not divided |
| 4 × 8 and 8 × 4 | 2 |
| All other cases | 4 | wherein the partitioning rule disables partitioning resulting in sub-partitions with a size of 1×N (N≥16) or 2×M (M≥8).

Disabling partitioning that results in sub-partitions with a size of 1×N (N≥16) or 2×M (M≥8) may take the memory burst size into account such that the use of memory bandwidth is improved. Consequently, the partitioning rule leads to more hardware-friendly sub-partitions. In addition, partitioning may be better suited for residual coefficients coding.

The partitioning rule may further disable partitioning resulting in sub-partitions with a size of N×1 (N≥16) or M×2 (M≥8). Such partitioning may be better suited for residual coefficients coding.

The at least one partitioning direction may be either horizontal or vertical. Alternatively, the partitioning rule may include partitioning in a horizontal plus a vertical partitioning direction. Partitioning in the horizontal plus the vertical partitioning direction may be exclusively applied to a block size of 8×8 samples.

Each sub-partition may contain at least 16 samples.

According to a first aspect of the second embodiment, the partitioning rule may include partitioning according to the following table:

| Block size | Number of sub-partitions | Partitioning direction |
| --- | --- | --- |
| 4 × 4 | Not divided | |
| 4 × 8 | 2 | Only horizontal partitioning, i.e. two 4 × 4 sub-partitions |
| 4 × N (N > 8) | 4 | Only horizontal partitioning |
| 8 × 4 | 2 | Horizontal or vertical partitioning |
| 8 × N (N > 4) | 4 | Only horizontal partitioning |
| All other cases allowed in ISP | 4 | Horizontal or vertical partitioning |

According to a second aspect of the second embodiment, the partitioning rule may include partitioning according to the following table:

| Block size | Number of sub-partitions | Partitioning direction |
| --- | --- | --- |
| 4 × 4 | Not divided | |
| 4 × 8 | 2 | Only horizontal partitioning, i.e. two 4 × 4 sub-partitions |
| 4 × N (N > 8) | 4 | Only horizontal partitioning |
| 8 × 4 | 2 | Only vertical partitioning |
| 8 × 8 | Not divided | |
| 8 × N (N > 8) | 4 | Only horizontal partitioning |
| 16 × 4 | 4 | Only vertical partitioning |
| 16 × 8 | 4 | Only vertical partitioning |
| All other cases allowed in ISP | 4 | Horizontal or vertical partitioning |

According to a third aspect of the second embodiment, the partitioning rule may include partitioning according to the following table:

| Block size | Number of sub-partitions | Partitioning direction |
| --- | --- | --- |
| 4 × 4 | Not divided | |
| 4 × 8 | 2 | Only horizontal partitioning, i.e. two 4 × 4 sub-partitions |
| 4 × N (N > 8) | 4 | Only horizontal partitioning |
| 8 × 4 | 2 | Only vertical partitioning |
| 8 × 8 | 4 | Horizontal plus vertical partitioning, resulting in four 4 × 4 blocks |
| 8 × N (N > 8) | 4 | Only horizontal partitioning |
| 16 × 4 | 4 | Only vertical partitioning |
| 16 × 8 | 4 | Only vertical partitioning |
| All other cases allowed in ISP | 4 | Horizontal, vertical, or horizontal plus vertical partitioning |

According to a fourth aspect of the second embodiment, the partitioning rule may include partitioning according to the following table:

| Block size | Number of sub-partitions | Partitioning direction |
| --- | --- | --- |
| 4 × 4 | Not divided | |
| 4 × 8 | 2 | Only horizontal partitioning, i.e. two 4 × 4 sub-partitions |

-continued

| Block size | Number of sub-partitions | Partitioning direction |
|---|---|---|
| 4 × N (N > 8) | 4 | Only horizontal partitioning |
| 8 × 4 | 2 | Only vertical partitioning |
| 8 × 8 | 4 | Horizontal plus vertical partitioning, resulting in four 4 × 4 blocks |
| 8 × N (N > 8) | 4 | Only horizontal partitioning |
| 16 × 4 | 4 | Only vertical partitioning |
| 16 × 8 | 4 | Only vertical partitioning |
| All other cases allowed in ISP | 4 | Horizontal or vertical partitioning |

According to a further aspect of the second embodiment, an encoder is provided comprising processing circuitry for carrying out any one of the methods of the second embodiment.

According to a further aspect of the second embodiment, a decoder is provided comprising processing circuitry for carrying out any one of the methods of the second embodiment.

Furthermore, a computer program product is provided comprising instructions which, when the program is executed by a computer, cause the computer to carry out any one of the methods of the second embodiment.

According to a further aspect of the second embodiment, a decoder or an encoder is provided, comprising one or more processors, and a non-transitory computer-readable storage medium coupled to the one or more processors and storing instructions for execution by the one or more processors, wherein the instructions, when executed by the one or more processors, configure the decoder or the encoder, respectively, to carry out any one of the methods of the second embodiment.

Furthermore, an encoder is provided, comprising a partitioning unit configured to obtain block size information of a current block, determine a number of sub-partitions and at least one partitioning direction, based on a partitioning rule and the block size information, and encode the current block according to the number of sub-partitions and the at least one partitioning direction.

A third embodiment of the present disclosure is a method of video coding implemented by a decoding device or an encoding device, wherein the method comprises obtaining a block size information of a current block (for example, a current block applied with ISP coding mode), determining a number of sub-partitions (for example, a number of sub-partitions is same as a number of sub-blocks after partition a block) and a partition direction, based on a present rule and the block size, decoding or coding (for example, partitioning) the current block according to the number of sub-partitions and the partition direction.

The present rule may be showed according to the following table:

| Block size | Number of sub-partitions | Partition direction |
|---|---|---|
| 4 × 4 | Not divided | |
| 4 × 8 | 2 | Only horizontal partition, i.e. 2 4 × 4 sub-partitions |
| 4 × N (N > 8) | 4 | Only horizontal partition |
| 8 × 4 | 2 | Allow both horizontal and vertical partition |
| 8 × N (N > 4) | 4 | Only horizontal partition |

| Block size | Number of sub-partitions | Partition direction |
|---|---|---|
| All other cases allowed in ISP | 4 | Allow both horizontal and vertical partition |

Alternatively, the present rule may be showed according to the following table:

| Block size | Number of sub-partitions | Partition direction |
|---|---|---|
| 4 × 4 | Not divided | |
| 4 × 8 | 2 | Only horizontal partition, i.e. 2 4 × 4 sub-partitions |
| 4 × N (N > 8) | 4 | Only horizontal partition |
| 8 × 4 | 2 | Only vertical partition |
| 8 × 8 | Not divided | |
| 8 × N (N > 8) | 4 | Only horizontal partition |
| 16 × 4 | 4 | Only vertical partition |
| 16 × 8 | 4 | Only vertical partition |
| All other cases allowed in ISP | 4 | Allow both horizontal and vertical partition |

Alternatively, the present rule may be showed according to the following table:

| Block size | Number of sub-partitions | Partition direction |
|---|---|---|
| 4 × 4 | Not divided | |
| 4 × 8 | 2 | Only horizontal partition, i.e. 2 4 × 4 sub-partitions |
| 4 × N (N > 8) | 4 | Only horizontal partition |
| 8 × 4 | 2 | Only vertical partition |
| 8 × 8 | 4 | New partition scheme and resulting 4 4 × 4 blocks |
| 8 × N (N > 8) | 4 | Only horizontal partition |
| 16 × 4 | 4 | Only vertical partition |
| 16 × 8 | 4 | Only vertical partition |
| All other cases allowed in ISP | 4 | Allow horizontal, vertical, and horizontal plus vertical partition |

Alternatively, the present rule may be showed according to the following table:

| Block size | Number of sub-partitions | Partition direction |
|---|---|---|
| 4 × 4 | Not divided | |
| 4 × 8 | 2 | Only horizontal partition, i.e. 2 4 × 4 sub-partitions |
| 4 × N (N > 8) | 4 | Only horizontal partition |
| 8 × 4 | 2 | Only vertical partition |
| 8 × 8 | 4 | New partition scheme and resulting 4 4 × 4 blocks |
| 8 × N (N > 8) | 4 | Only horizontal partition |
| 16 × 4 | 4 | Only vertical partition |
| 16 × 8 | 4 | Only vertical partition |
| All other cases allowed in ISP | 4 | Allow both horizontal and vertical partition |

According to a further aspect of the third embodiment, an encoder is provided comprising processing circuitry for carrying out any one of the methods of the third embodiment.

According to a further aspect of the third embodiment, a decoder is provided comprising processing circuitry for carrying out any one of the methods of the third embodiment.

According to a further aspect of the third embodiment, a computer program product is provided comprising a program code for performing any one of the methods of the third embodiment.

Furthermore, a decoder or an encoder comprising one or more processors, and a non-transitory computer-readable storage medium coupled to the processors and storing programming for execution by the processors, wherein the programming, when executed by the processors, configures the decoder to carry out any one of the methods of the third embodiment.

A fourth embodiment of the present disclosure is a data that is stored in a memory or transmitted via a transmission medium, wherein the data is generated by using any of the above described coding methods or encoders.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the disclosure are described with reference to the attached figures and drawings.

Figure 1A:
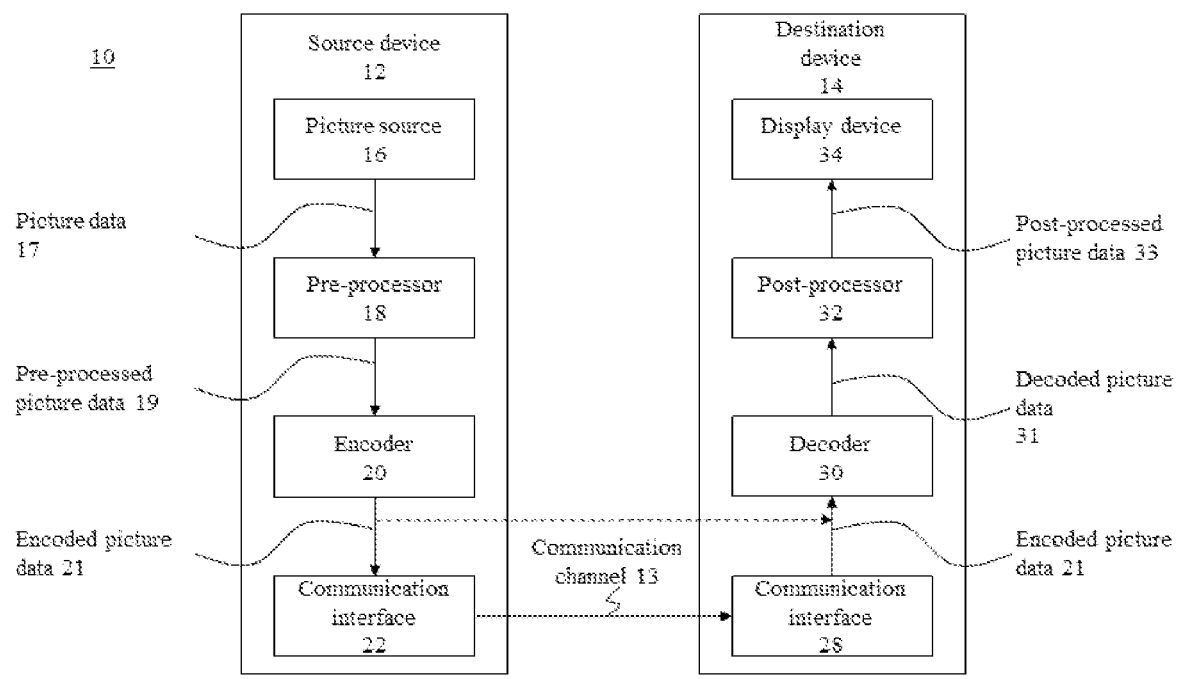
FIG. 1A is a block diagram showing an example of a video coding system configured to implement embodiments of the disclosure.

In the following, identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture", the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data employed for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC.

In case of lossless video coding, the original video pictures can be reconstructed, i.e. the reconstructed video pictures have the same quality as the original video pictures (assuming no transmission loss or other data loss occurs during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and two-dimensional (2D) transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or coding system 10) that may utilize techniques of this present application. Video encoder 20 (or encoder 20) and video decoder 30 (or decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 may be configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from red, green, and blue (RGB) to luma, blue-difference chroma, and red-difference chroma (YCbCr)), color correction, or de-noising. It can be understood that the pre-processing unit 18 may be an optional component.

The video encoder 20 may be configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 may be configured to receive the encoded picture data 21 (or any further processed version thereof), e.g. directly from the source device 12 or from any other source, e.g. a storage device, such as an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or as bi-directional communication interfaces, and may be configured to send and receive messages, e.g. to set up a connection, to acknowledge and exchange any other information related to the communication link and/or data transmission, such as encoded picture data transmission.

The decoder 30 may be configured to receive the encoded picture data 21 and provide decoded picture data 31 or a decoded picture 31 (further details will be described below, e.g., based on FIG. 3 or FIG. 5). The post-processor 32 of destination device 14 may be configured to post-process the decoded picture data 31 (also called reconstructed picture data), e.g. the decoded picture 31, to obtain post-processed picture data 33, such as a post-processed picture 33. The post-processing performed by the post-processing unit 32 may comprise any one or more of color format conversion (e.g. from YCbCr to RGB), color correction, trimming, or re-sampling, or any other processing, e.g. for preparing the decoded picture data 31 for display, e.g. by display device 34.

The display device 34 of the destination device 14 may be configured to receive the post-processed picture data 33 for displaying the picture, e.g. to a user or viewer. The display device 34 may be or comprise any kind of display for representing the reconstructed picture, such as an integrated or external display or monitor. The display may be a liquid crystal-displays (LCD), an organic light-emitting diode (LED) (OLED) display, a plasma display, a projector, a micro LED display, a liquid-crystal on silicon (LCoS), a digital light processor (DLP) or any kind of other display.

Although FIG. 1A depicts the source device 12 and the destination device 14 as separate devices, embodiments of devices may also comprise both devices or both functionalities, i.e. the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
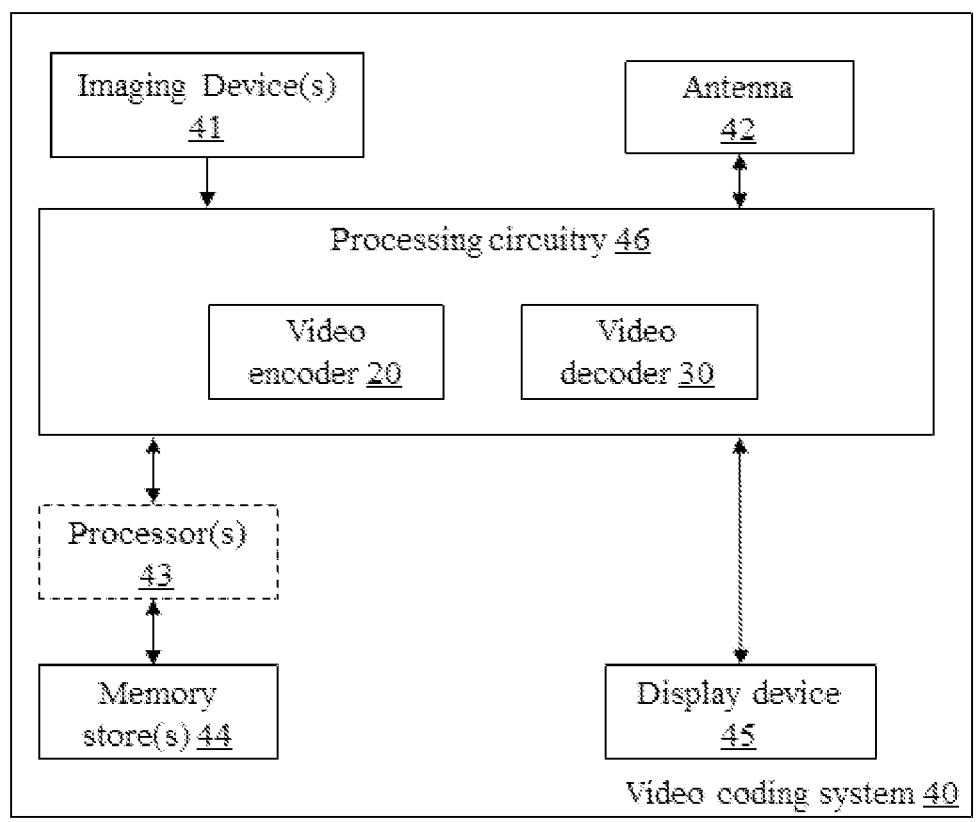
FIG. 1B is a block diagram showing another example of a video coding system configured to implement embodiments of the disclosure.

The encoder 20 (e.g. a video encoder 20) or the decoder 30 (e.g. a video decoder 30) or both, encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Video encoder 20 and video decoder 30 may be integrated as part of a combined encoder/decoder (CODEC) in a single device, for example, as shown in FIG. 1B.

The video coding system 40 shown in FIG. 1B comprises a processing circuitry implementing both a video encoder 20 and a video decoder 30. In addition, one or more imaging devices 41, such as a camera for capturing real-world pictures, an antenna 42, one or more memory stores 44, one or more processors 43 and/or a display device 45, such the display device 34 described above, may be provided as part of the video coding system 40.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver devices, broadcast transmitter devices, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding systems (e.g., video encoding or video decoding) that do not necessarily include any data communication between the encoding and decoding devices. In other examples, data is retrieved from a local memory, streamed over a network, or the like. A video encoding device may encode and store data in memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High Efficiency Video Coding (HEVC) or to the reference software of Versatile Video coding (VVC), the next generation video coding standard developed by the Joint Collaboration Team on Video Coding (JCT-VC) of International Telecommunication Union (ITU) Telecommunication Standardization Sector (ITU-T) Video Coding Experts Group (VCEG) and the International Organization for Standardization (ISO)/the International Electrotechnical Commission (IEC) Motion Picture Experts Group (MPEG). One of ordinary skill in the art will understand that embodiments of the disclosure are not limited to HEVC or VVC.

Figure 2:
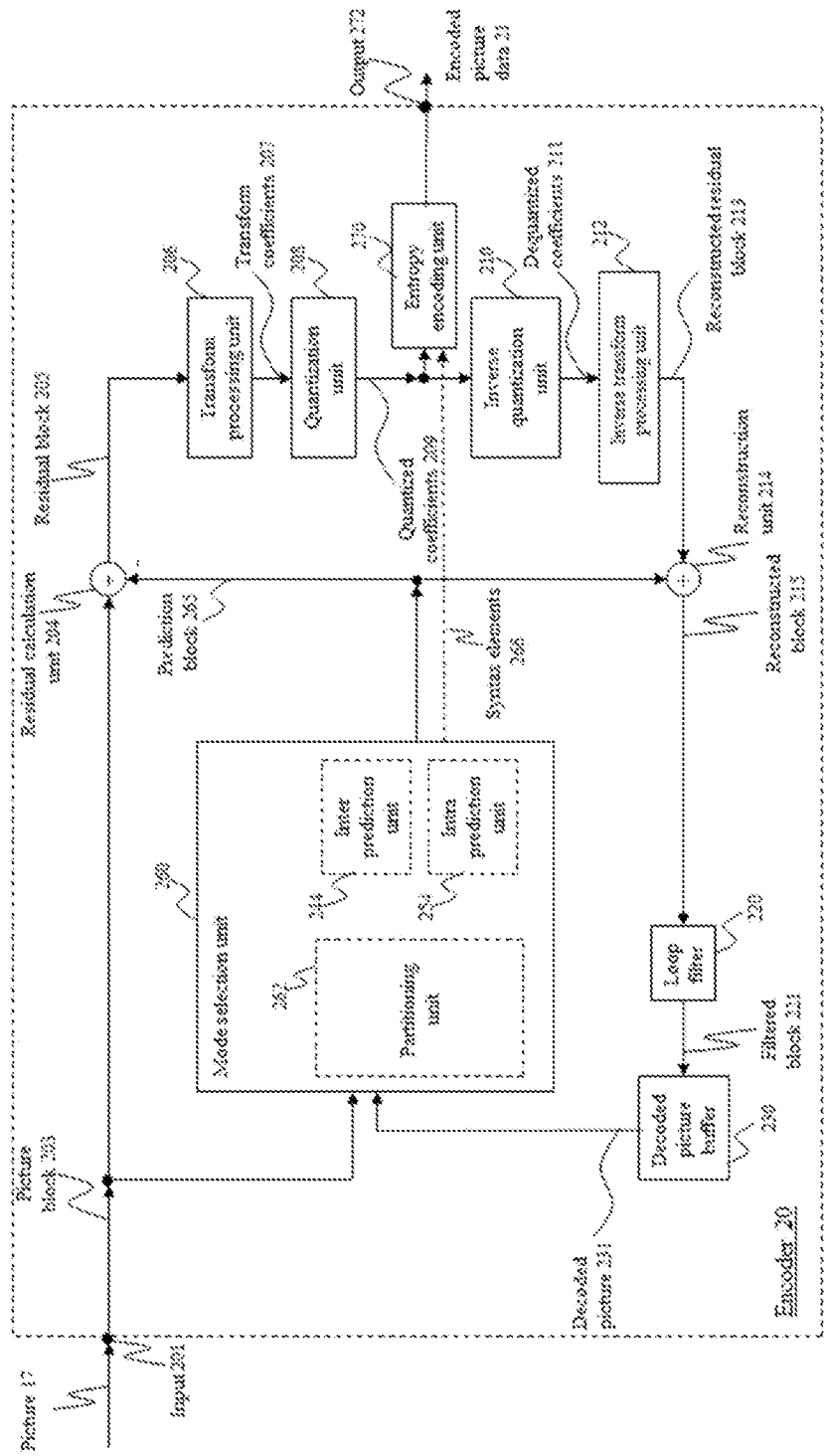
FIG. 2 is a block diagram showing an example of a video encoder configured to implement embodiments of the disclosure.

Encoder and Encoding Method:

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and an inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. The inter prediction unit 244 may include a motion estimation unit and a motion compensation unit (not shown). A video encoder 20 as shown in FIG. 2 may also be referred to as a hybrid video encoder or a video encoder according to a hybrid video codec.

Figure 3:
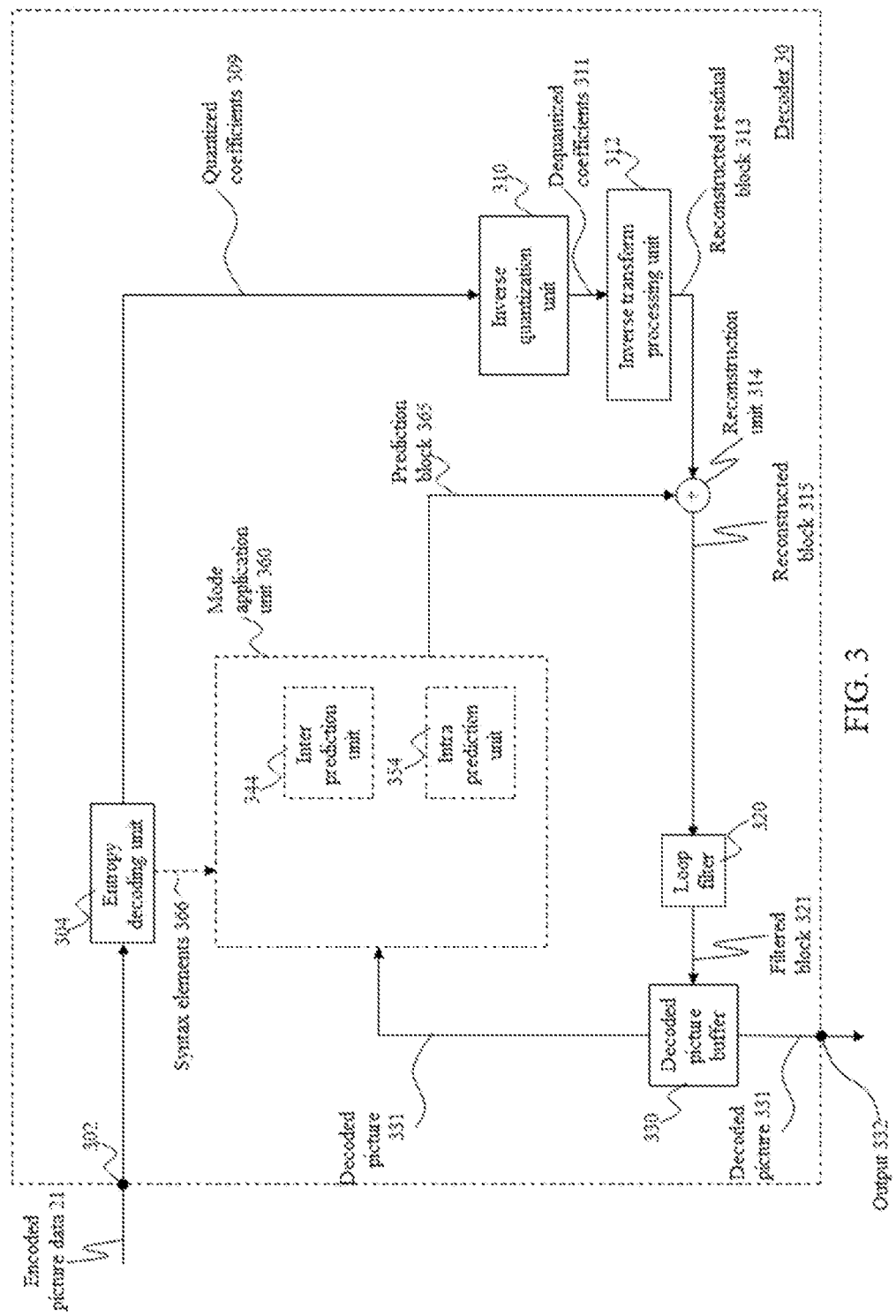
FIG. 3 is a block diagram showing an example structure of a video decoder configured to implement embodiments of the disclosure.

The residual calculation unit 204, the transform processing unit 206, the quantization unit 208, and the mode selection unit 260 may be referred to as forming a forward signal path of the encoder 20, whereas the inverse quantization unit 210, the inverse transform processing unit 212, the reconstruction unit 214, the loop filter 220, the DPB 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the DPB 230, the inter prediction unit 244 and the intra-prediction unit 254 are also referred to forming the "built-in decoder" of video encoder 20.

Pictures & Picture Partitioning (Pictures & Blocks):

The encoder 20 may be configured to receive, e.g. via input 201, a picture 17 (or picture data 17), e.g. a picture of a sequence of pictures forming a video or video sequence. The received picture or picture data may also be a pre-processed picture 19 (or pre-processed picture data 19). For the sake of simplicity, the following description refers to the picture 17. The picture 17 may also be referred to as a current picture or a picture to be coded (in particular, in video coding to distinguish the current picture from other pictures, e.g. previously encoded and/or decoded pictures of the same video sequence, i.e. the video sequence which also comprises the current picture).

A (digital) picture is or can be regarded as a 2D array or matrix of samples with intensity values. A sample in the array may also be referred to as pixel (short form of picture element) or a pel. The number of samples in the horizontal and vertical direction (or axis) of the array or picture defines the size and/or resolution of the picture. For representation of color, typically three color components are employed, i.e. the picture may be represented as or include three sample arrays. In RBG format or color space, a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or luma) component Y represents the brightness or grey level intensity (e.g. like in a grey-scale picture), while the two chrominance (or chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa. The process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/Advanced Video Coding (AVC)) or coding tree blocks (CTBs) or coding tree units (CTUs) (according to H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in the horizontal and vertical direction (or axis) of the block 203 defines the size of the block 203. Accordingly, a block may, for example, comprise an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (or as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (or video tile groups) and/or tiles (or video tiles), wherein a picture may be partitioned into or encoded using one or more tile groups (typically non-overlapping), and each tile group may comprise one or more blocks (e.g. CTUs) or one or more tiles, wherein each tile may be of rectangular shape and may comprise one or more blocks (e.g. CTUs), e.g. complete or fractional blocks.

Residual Calculation:

The residual calculation unit 204 may be configured to calculate a residual block 205 (or residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform:

The transform processing unit 206 may be configured to apply a transform, such as a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively, the transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization:

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit transform coefficient during quantization, where n is greater than m. The degree of quantization may be modified by adjusting a quantization parameter (QP). For example, for scalar quantization, different scalings may be applied to achieve finer or coarser quantization. Smaller quantization step sizes correspond to finer quantization, whereas larger quantization step sizes correspond to coarser quantization. The applicable quantization step size may be indicated by a QP. The quantization parameter may, for example, be an index of a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one exemplary implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively, the quantization unit 208) may be configured to output QPs, e.g. directly or encoded via the entropy encoding unit 270, so that, e.g., the video decoder 30 may receive and apply the quantization parameters for decoding.

Inverse Quantization:

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform:

The inverse transform processing unit 212 is configured to apply the inverse transform of the transform applied by the transform processing unit 206, e.g. an inverse DCT or inverse DST or other inverse transforms, to obtain a reconstructed residual block 213 (or corresponding dequantized coefficients 213) in the sample domain. The reconstructed residual block 213 may also be referred to as a transform block 213.

Reconstruction:

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering:

The loop filter unit 220 (or loop filter 220), is configured to filter the reconstructed block 215 to obtain a filtered block 221, or in general, to filter reconstructed samples to obtain filtered samples. The loop filter unit may be configured to smooth pixel transitions, or otherwise improve the video quality. The loop filter unit 220 may comprise one or more loop filters such as a de-blocking filter, a sample-adaptive offset (SAO) filter or one or more other filters, such as a bilateral filter, an adaptive loop filter (ALF), a sharpening, a smoothing filter or a collaborative filter, or any combination thereof. Although the loop filter unit 220 is shown in FIG. 2 as being an in-loop filter, in other configurations, the loop filter unit 220 may be implemented as a post loop filter. The filtered block 221 may also be referred to as a filtered reconstructed block 221.

Embodiments of the video encoder 20 (respectively, the loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

DPB:

The DPB 230 may be a memory that stores reference pictures, or in general reference picture data, for encoding video data by video encoder 20. The DPB 230 may be formed by any of a variety of memory devices, such as dynamic random-access memory (RAM) (DRAM), including synchronous DRAM (SDRAM), magnetoresistive RAM (MRAM), resistive RAM (RRAIVI), or other types of memory devices. The DPB 230 may be configured to store one or more filtered blocks 221. The DPB 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The DPB 230 may also be configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction):

The mode selection unit 260 comprises partitioning unit 262, inter-prediction unit 244 and intra-prediction unit 254, and is configured to receive or obtain original picture data, such as an original block 203 (current block 203 of the current picture 17), and reconstructed picture data, such as filtered and/or unfiltered reconstructed samples or blocks of the same (current) picture and/or from one or a plurality of previously decoded pictures, e.g. from DPB 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra- or inter-prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which again form blocks), e.g. iteratively using quad-tree (QT)-partitioning, binary-tree (BT) partitioning, or triple-tree (TT)-partitioning or any combination thereof, and to perform the prediction for each of the block partitions or sub-blocks, wherein the mode selection comprises the selection of the tree-structure of the partitioned block 203 and the prediction modes are applied to each of the block partitions or sub-blocks.

In the following, the partitioning (e.g. by partitioning unit 262) and prediction processing (by inter-prediction unit 244 and intra-prediction unit 254) performed by an example video encoder 20 will be explained in more detail.

Partitioning:

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to as tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as a BT, a tree using partitioning into three partitions is referred to as a TT, and a tree using partitioning into four partitions is referred to as a QT.

As mentioned before, the term "block" as used herein may be a portion, in particular a square or rectangular portion, of a picture. With reference, for example, to HEVC and VVC, the block may be or correspond to a CTU, a coding unit (CU), a prediction unit (PU), or a transform unit (TU) and/or to the corresponding blocks, e.g. a CTB, a coding block (CB), a transform block (TB) or a prediction block (PB).

For example, a CTU may be or comprise a CTB of luma samples and two corresponding CTBs of chroma samples of a picture that has three sample arrays, or a CTB of samples of a monochrome picture or a picture that is coded using three separate colour planes and syntax structures used to code the samples. Correspondingly, a CTB may be an N×N block of samples for some value of N such that the division of a component into CTBs is a partitioning. A CU may be or comprise a coding block of luma samples and two corresponding coding blocks of chroma samples of a picture that has three sample arrays, or a coding block of samples of a monochrome picture or a picture that is coded using three separate colour planes and syntax structures used to code the samples. Correspondingly, a CB may be an M×N block of samples for some values of M and N such that the division of a CTB into coding blocks is a partitioning.

In some embodiments, e.g., according to HEVC, a CTU may be split into CUs by using a quad-tree structure denoted as a coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into TUs according to another quad-tree structure similar to the coding tree for the CU.

In embodiments, e.g., according to the latest video coding standard currently in development, which is referred to as VVC, a combined QT and BT (QTBT) partitioning is for example used to partition a coding block. In the QTBT block structure, a CU can have either a square or rectangular shape. For example, a CTU is first partitioned by a quad-tree structure. The quad-tree leaf nodes are further partitioned by a binary-tree or ternary (or triple)-tree structure. The partitioning tree leaf nodes are called CUs, and that partition is used for prediction and transform processing without any further partitioning. This means that the CU, PU and TU have the same block size in the QTBT coding block structure. In parallel, multiple partitions, for example, triple-tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise intra-prediction modes and/or inter-prediction modes.

Intra-Prediction:

The set of intra-prediction modes may comprise 35 different intra-prediction modes, such as non-directional modes like direct current (DC) (or mean) mode and planar mode, or directional modes, e.g. as defined in HEVC, or may comprise 67 different intra-prediction modes, such as non-directional modes like DC (or mean) mode and planar mode, or directional modes, e.g. as defined for VVC.

The intra-prediction unit 254 is configured to use reconstructed samples of neighboring blocks of the same current picture to generate an (intra-)prediction block 265 according to an intra-prediction mode from the set of intra-prediction modes.

The intra-prediction unit 254 (or in general the mode selection unit 260) may be further configured to output intra-prediction parameters (or in general information indicative of the selected intra-prediction mode for the block) to the entropy encoding unit 270 in the form of syntax elements 266 for inclusion into the encoded picture data 21, so that, e.g., the video decoder 30 may receive and use the prediction parameters for decoding.

Inter-Prediction:

The set of (or possible) inter-prediction modes depends on the available reference pictures (i.e. previous, at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, such as half/semi-pel and/or quarter-pel interpolation, or not.

In addition to the above prediction modes, skip mode and/or direct mode may be applied.

The inter-prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, such as reconstructed blocks of one or a plurality of previously decoded pictures 231, for motion estimation. By way of example, a video sequence may comprise the current picture and the previously decoded pictures 231, or in other words, the current picture and the previously decoded pictures 231 may be part of or form a sequence of pictures forming a video sequence.

The encoder 20 may be configured to select a reference block from a plurality of reference blocks of the same or different pictures of the plurality of previously decoded pictures and provide a reference picture (or reference picture index) and/or an offset (spatial offset) between the position (x, y coordinates) of the reference block and the position of the current block as inter-prediction parameters to the motion estimation unit. This offset is also called motion vector (MV).

The motion compensation unit may be configured to obtain, e.g. receive, an inter-prediction parameter and to perform inter-prediction based on or using the inter-prediction parameter to obtain an (inter-)prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding:

The entropy encoding unit 270 is configured to apply, for example, an entropy encoding algorithm or scheme (e.g. a variable length coding (VLC) scheme, a context adaptive VLC scheme (CAVLC), an arithmetic coding scheme, a binarization, a context adaptive binary arithmetic coding (CABAC), syntax-based CABAC (SBAC), probability interval partitioning entropy (PIPE) coding or another entropy encoding methodology or technique) or bypass (no compression) on the quantized coefficients 209, inter-prediction parameters, intra-prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method:

FIG. 3 shows an example of a video decoder 30 that is configured to implement the techniques of the present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile group or tile) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a DBP 330, a mode application unit 360, an inter-prediction unit 344 and an intra-prediction unit 354. Inter-prediction unit 344 may be or include a motion compensation unit. Video decoder 30 may, in some examples, perform a decoding pass generally reciprocal to the encoding pass described with respect to video encoder 20 of FIG. 2.

As explained with regard to the encoder 20, the inverse quantization unit 210, the inverse transform processing unit 212, the reconstruction unit 214, the loop filter 220, the DPB 230, the inter-prediction unit 244 and the intra-prediction unit 254 are also referred to as forming the "built-in decoder" of video encoder 20. Accordingly, the inverse quantization unit 310 may be identical in function to the inverse quantization unit 210, the inverse transform processing unit 312 may be identical in function to the inverse transform processing unit 212, the reconstruction unit 314 may be identical in function to reconstruction unit 214, the loop filter 320 may be identical in function to the loop filter 220, and the DPB 330 may be identical in function to the DPB 230. Therefore, the explanations provided for the respective units and functions of the video 20 encoder apply correspondingly to the respective units and functions of the video decoder 30.

Entropy Decoding:

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters 366, such as any or all of inter-prediction parameters (e.g. reference picture index and motion vector), intra-prediction parameters (e.g. intra-prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter-prediction parameters, intra-prediction parameters and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization:

The inverse quantization unit 310 may be configured to receive QPs (or in general, information related to the inverse quantization) and quantized coefficients from the encoded picture data 21 (e.g. by parsing and/or decoding, e.g. by entropy decoding unit 304) and to apply, based on the quantization parameters, an inverse quantization to the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform:

Inverse transform processing unit 312 may be configured to receive dequantized coefficients 311, also referred to as transform coefficients 311, and to apply a transform to the dequantized coefficients 311 in order to obtain reconstructed residual blocks 313 in the sample domain. The reconstructed residual blocks 313 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction:

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering:

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a SAO filter or one or more other filters, e.g. a bilateral filter, an ALF, a sharpening, a smoothing filter or a collaborative filter, or any combination thereof. Although the loop filter unit 320 is shown in FIG. 3 as being an in-loop filter, in other configurations, the loop filter unit 320 may be implemented as a post loop filter.

DPB:

The decoded video blocks 321 of a picture are then stored in the DPB 330, which stores the decoded pictures 331 as reference pictures for subsequent motion compensation for other pictures and/or for output or respectively display.

The decoder 30 is configured to output the decoded picture 311, e.g. via output 312, for presentation or viewing to a user.

Prediction:

The inter-prediction unit 344 may be identical to the inter-prediction unit 244 (in particular, to the motion compensation unit) and the intra-prediction unit 354 may be identical to the intra-prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra- or inter-prediction) per block based on reconstructed pictures, blocks or respective samples (filtered or unfiltered) to obtain the prediction block 365.

When the video slice or picture is coded as an intra-coded (I) slice, intra-prediction unit 354 of mode application unit 360 is configured to generate prediction block 365 for a picture block of the current video slice based on a signaled intra-prediction mode and data from previously decoded blocks of the current picture. When the video slice or picture is coded as an inter-coded (i.e., B, or P) slice, inter-prediction unit 344 (e.g. motion compensation unit) of mode application unit 360 is configured to produce prediction block 365 for a video block of the current video slice based on the motion vectors and other syntax elements received from entropy decoding unit 304. For inter-prediction, the prediction blocks may be produced from one of the reference pictures within one of the reference picture lists. Video decoder 30 may construct the reference picture lists, List 0 and List 1, using default construction techniques based on reference pictures stored in DPB 330. The same or similar approach may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video/picture block of the current video slice by parsing the motion vectors or related information and other syntax elements, and use the prediction information to produce the prediction blocks for the current video block being decoded. For example, the mode application unit 360 uses some of the received syntax elements to determine a prediction mode (e.g., intra- or inter-prediction) used to code the video blocks of the video slice, an inter-prediction slice type (e.g., B slice, P slice, or generalized P/B (GPB) slice), construction information for one or more of the reference picture lists for the slice, motion vectors for each inter-coded video block of the slice, inter-prediction status for each inter-coded video block of the slice, and other information to decode the video blocks in the current video slice. The same or similar approach may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (or video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (or video tile groups) and/or tiles (or video tiles), wherein a picture may be partitioned into or decoded using one or more tile groups (typically non-overlapping), and each tile group may comprise one or more blocks (e.g. CTUs) or one or more tiles, wherein each tile may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of the current block (including but not limited to control point motion vectors of affine mode, sub-block motion vectors in affine, planar (ATMVP) modes, temporal motion vectors, and so on). For example, the value of a motion vector is constrained to a predefined range according to its representing bit number. If the representing bit number of the motion vector is bitDepth, then the range is $-2^{(bitDepth-1)} \sim 2^{(bitDepth-1)}-1$, where "^" means exponentiation. For example, if bitDepth is set equal to 16, the range is $-32768 \sim 32767$, if bitDepth is set equal to 18, the range is $-131072 \sim 131071$. For example, the value of the derived motion vector (e.g. the MVs of four 4×4 sub-blocks within one 8×8 block) is constrained such that the maximum difference between integer parts of the four 4×4 sub-block MVs is no more than N pixels, such as no more than 1 pixel. The following description provides two methods for constraining the motion vector according to the bitDepth.

Method 1: remove the overflow most significant bit (MSB) by the following operations:

$$ux=(mvx+2^{bitDepth})\%2^{bitDepth}, \quad (1)$$

$$mvx=(ux>=2^{bitDepth-1})?(ux-2^{bitDepth}):ux, \quad (2)$$

$$uy=(mvy+2^{bitDepth})\%2^{bitDepth}, \text{ and} \quad (3)$$

$$mvy=(uy>=2^{bitDepth-1})?(uy-2^{bitDepth}):uy, \quad (4)$$

where mvx is a horizontal component of a motion vector of an image block or a sub-block, mvy is a vertical component of a motion vector of an image block or a sub-block, and ux and uy indicate respective intermediate values.

For example, if the value of mvx is −32769, after applying formulae (1) and (2), the resulting value is 32767. In a computer system, decimal numbers are stored as two's complements. The two's complement of −32769 is 1,0111, 1111, 1111, 1111 (17 bits). Then, the MSB is discarded, so the resulting two's complement is 0111, 1111, 1111, 1111 (decimal number is 32767), which is the same as the output by applying formulae (1) and (2).

$$ux=(mvpx+mvdx+2^{bitDepth})\%2^{bitDepth}, \quad (5)$$

$$mvx=(ux>=2^{bitDepth-1})?(ux-2^{bitDepth}):ux, \quad (6)$$

$$uy=(mvpy+mvdy+2^{bitDepth})\%2^{bitDepth}, \text{ and} \quad (7)$$

$$mvy=(uy>=2^{bitDepth-1})?(uy-2^{bitDepth}):uy. \quad (8)$$

The operations may be applied during the sum of the motion vector predictor mvp and the motion vector difference mvd, as shown in formulae (5) to (8).

Method 2: remove the overflow MSB by clipping the value:

$$vx=\text{Clip3}(-2^{bitDepth-1}, 2^{bitDepth-1}-1, vx) \text{ and}$$

$$vy=\text{Clip3}(-2^{bitDepth-1}, 2^{bitDepth-1}-1, vy),$$

where vx is a horizontal component of a motion vector of an image block or a sub-block, vy is a vertical component of a motion vector of an image block or a sub-block, x, y and z respectively correspond to three input values of the MV clipping process, and the definition of the function Clip3 is as follows:

$$\text{Clip3}(x, y, z) = \begin{cases} x; & z < x \\ y; & z > y \\ z; & \text{otherwise} \end{cases}.$$

Figure 4:
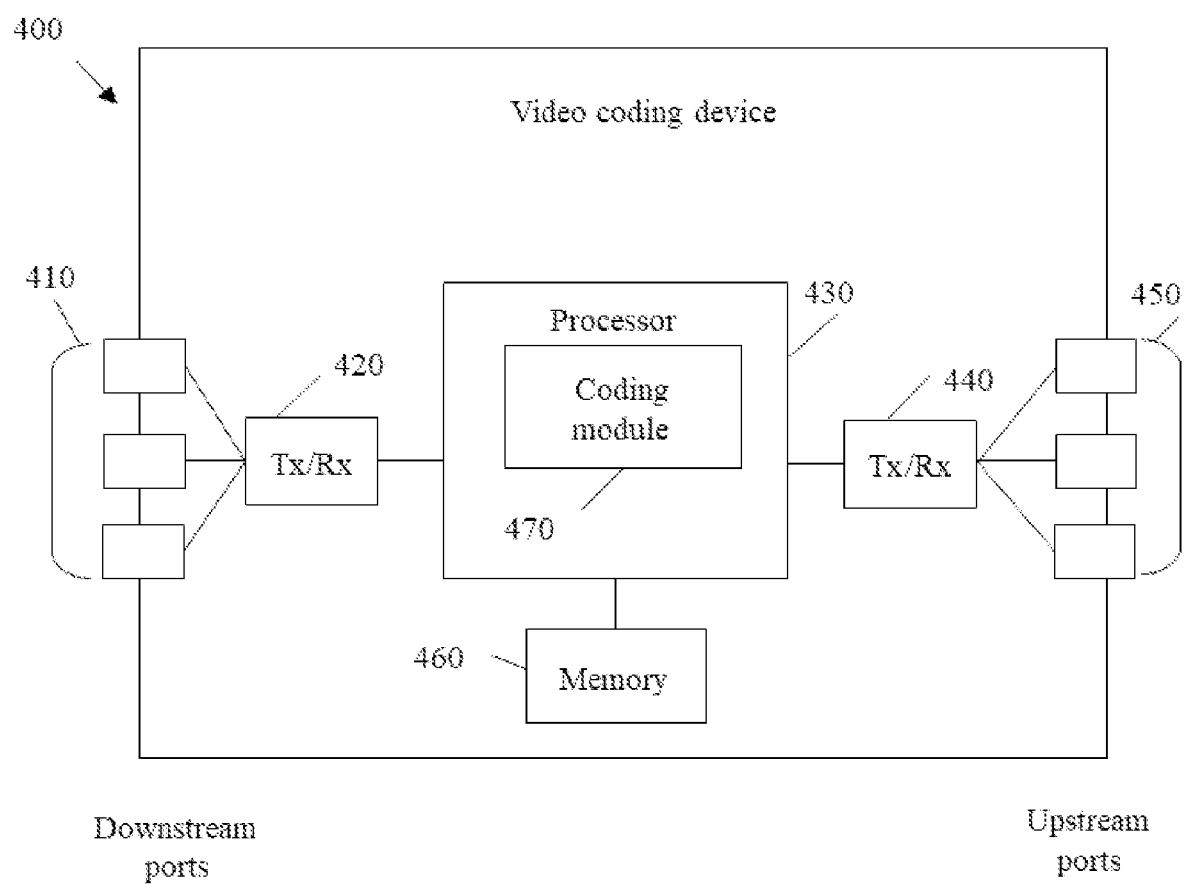
FIG. 4 is a block diagram illustrating an example of an encoding apparatus or a decoding apparatus.

FIG. 4 is a schematic diagram of a video coding device 400 according to an embodiment of the present disclosure. The video coding device 400 is suitable for implementing the disclosed embodiments as described below. In an embodiment, the video coding device 400 may be a decoder such as video decoder 30 of FIG. 1A or an encoder such as video encoder 20 of FIG. 1A.

The video coding device 400 may comprise ingress ports 410 (or input ports 410) and one or more receiver units (Rx) 420 for receiving data, a processor, logic unit, or central processing unit (CPU) 430 to process the data, one or more transmitter units (Tx) 440 and egress ports 450 (or output ports 450) for transmitting the data, and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 may be implemented by hardware and software. The processor 430 may be implemented as one or more CPU chips, cores (e.g., as a multi-core processor), FPGAs, ASICs, and DSPs. The processor 430 may be in communication with the ingress ports 410, the receiver units 420, the transmitter units 440, egress ports 450, and the memory 460. The processor 430 may comprise a coding module 470. The coding module 470 implements the disclosed embodiments described above and below. For instance, the coding module 470 may implement, process, prepare, or provide the various coding operations. The inclusion of the coding module 470 therefore provides a substantial improvement to the functionality of the video coding device 400 and effects a transformation of the video coding device 400 to a different state. Alternatively, the coding module 470 may be implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), RAM, ternary content-addressable memory (TCAM), and/or static RAM (SRAM).

Figure 5:
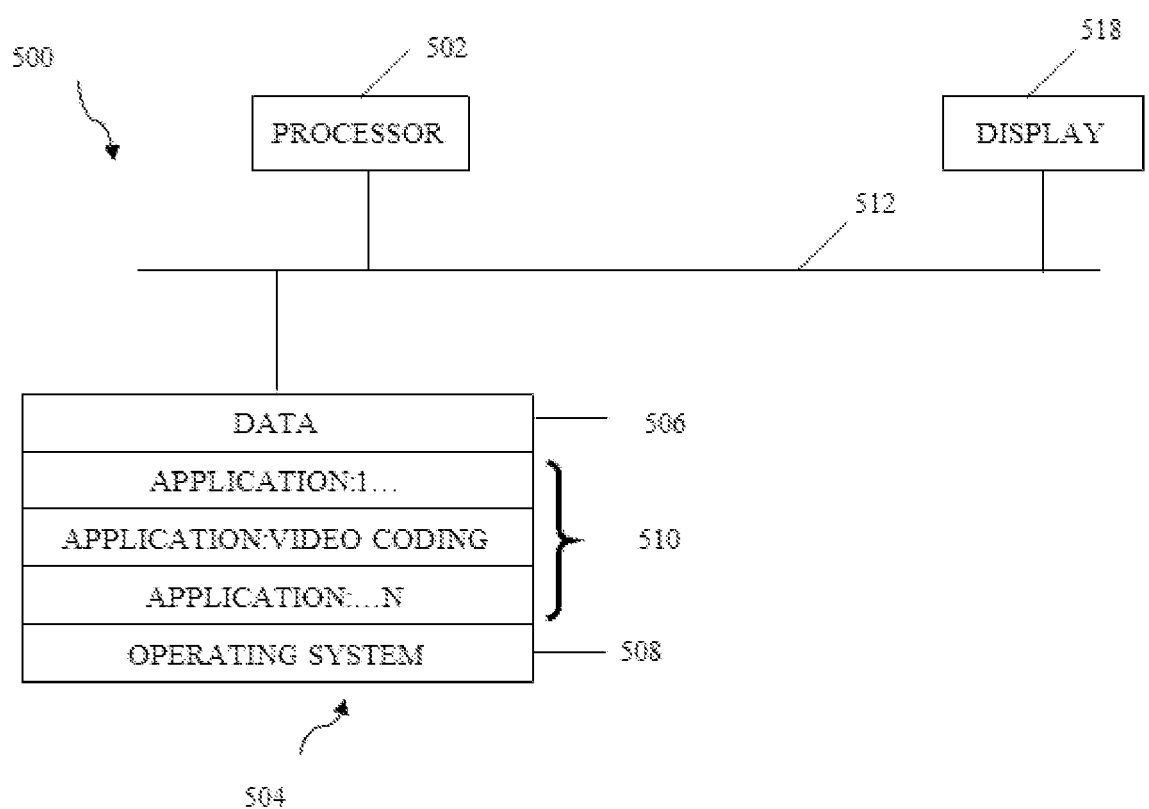
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1A according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a ROM device or a RAM device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described herein. For example, the application programs 510 can include applications 1 through N, which further include a video coding application that performs the methods described herein.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, a secondary storage (not shown) can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Figure 6:
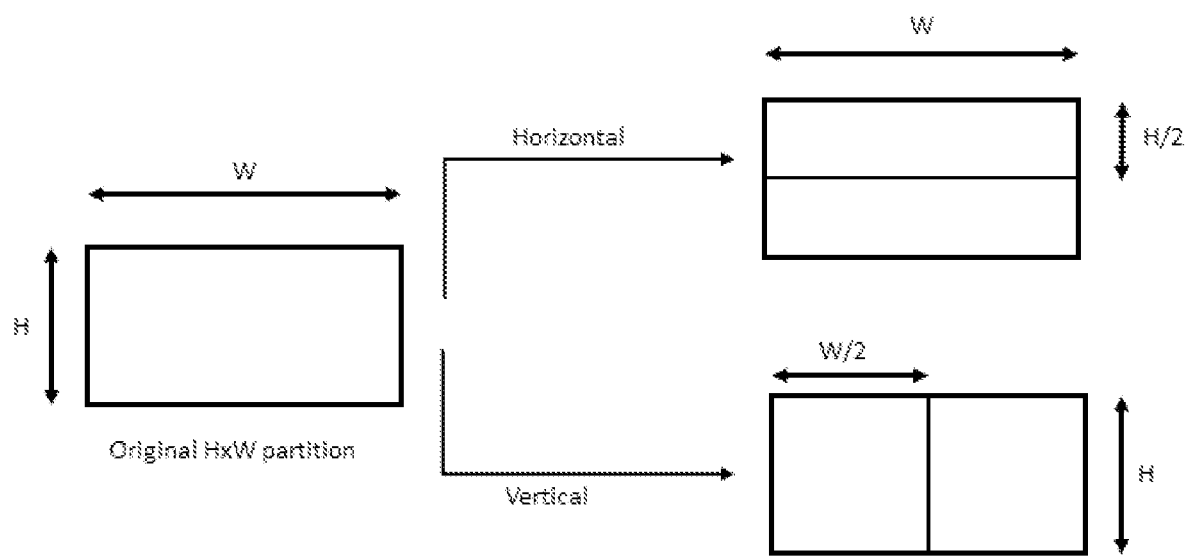
FIG. 6 shows an example for the partitioning of 4×8 and 8×4 blocks for ISP coding.
Figure 7:
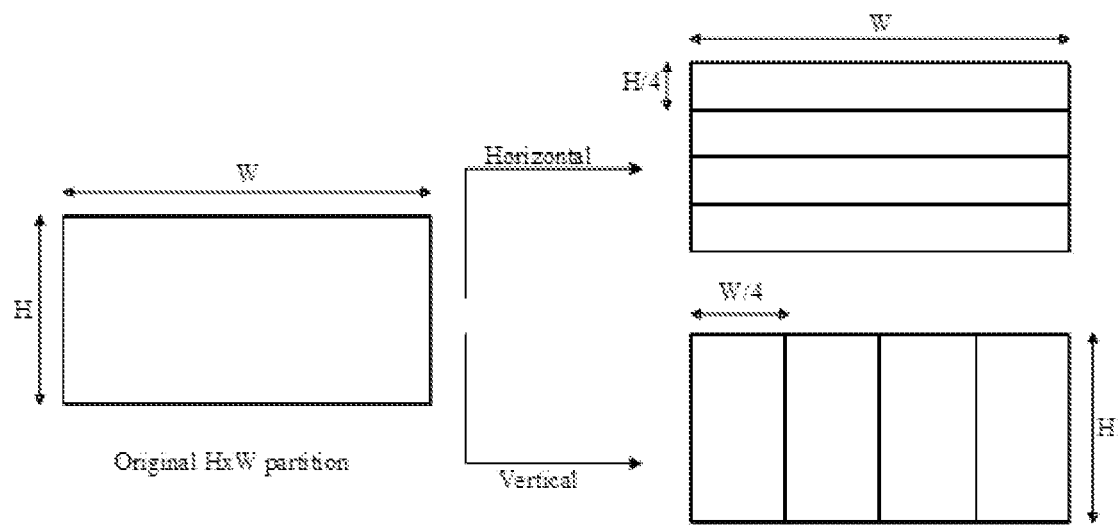
FIG. 7 shows an example for the partitioning of all blocks except 4×8, 8×4 and 4×4 blocks for ISP coding.

ISP Coding Mode:

The ISP coding mode is a tool newly adopted in VTM4.0 (NET-M0102). It divides luma intra-predicted blocks vertically or horizontally into 2 or 4 sub-partitions depending on the block size dimensions, as shown in Table 1. FIG. 6 and FIG. 7 show examples of the two possibilities. All sub-partitions fulfill the condition of having at least 16 samples.

FIG. 6 shows an example for the partitioning of 4×8 and 8×4 blocks for ISP coding. The original block is partitioned into 2 sub-partitions by horizontal or vertical partitioning. FIG. 7 shows an example for the partitioning of all blocks except 4×8, 8×4 and 4×4 blocks for ISP coding. The original block is partitioned into 4 sub-partitions by horizontal or vertical partitioning.

For each of these sub-partitions, a residual signal is generated by entropy decoding the coefficients sent by the encoder and then inverse quantizing and inverse transforming them. Then, the sub-partition is intra-predicted and finally the corresponding reconstructed samples are obtained by adding the residual signal to the prediction signal. Therefore, the reconstructed values of each sub-partition will be available to generate the prediction of the next sub-partition, for which the process will be repeated and so on. All sub-partitions share the same intra mode.

The division of ISP can result in sub-partition sizes that are difficult to implement for hardware or need adaptation to other coding techniques.

Figure 8:
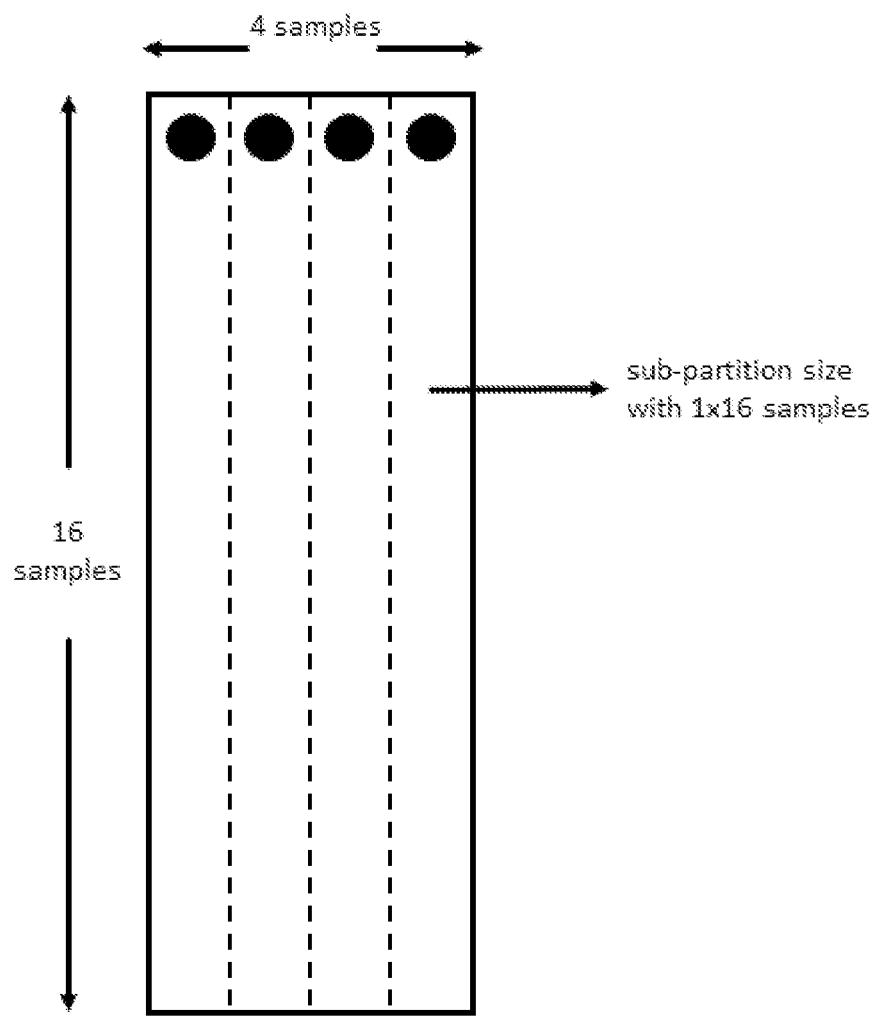
FIG. 8 shows an example for the partitioning of an intra block of size 4×16 with a sub-partition size with 1×16 samples.

For example, when the luma intra block is 4×16 and is divided by vertical splitting, the size of the four sub-partitions is 1×16, as shown in FIG. 8. Exemplary samples are shown in the figure as filled circles. Such a sub-partition is not friendly to hardware implementation.

Figure 9:
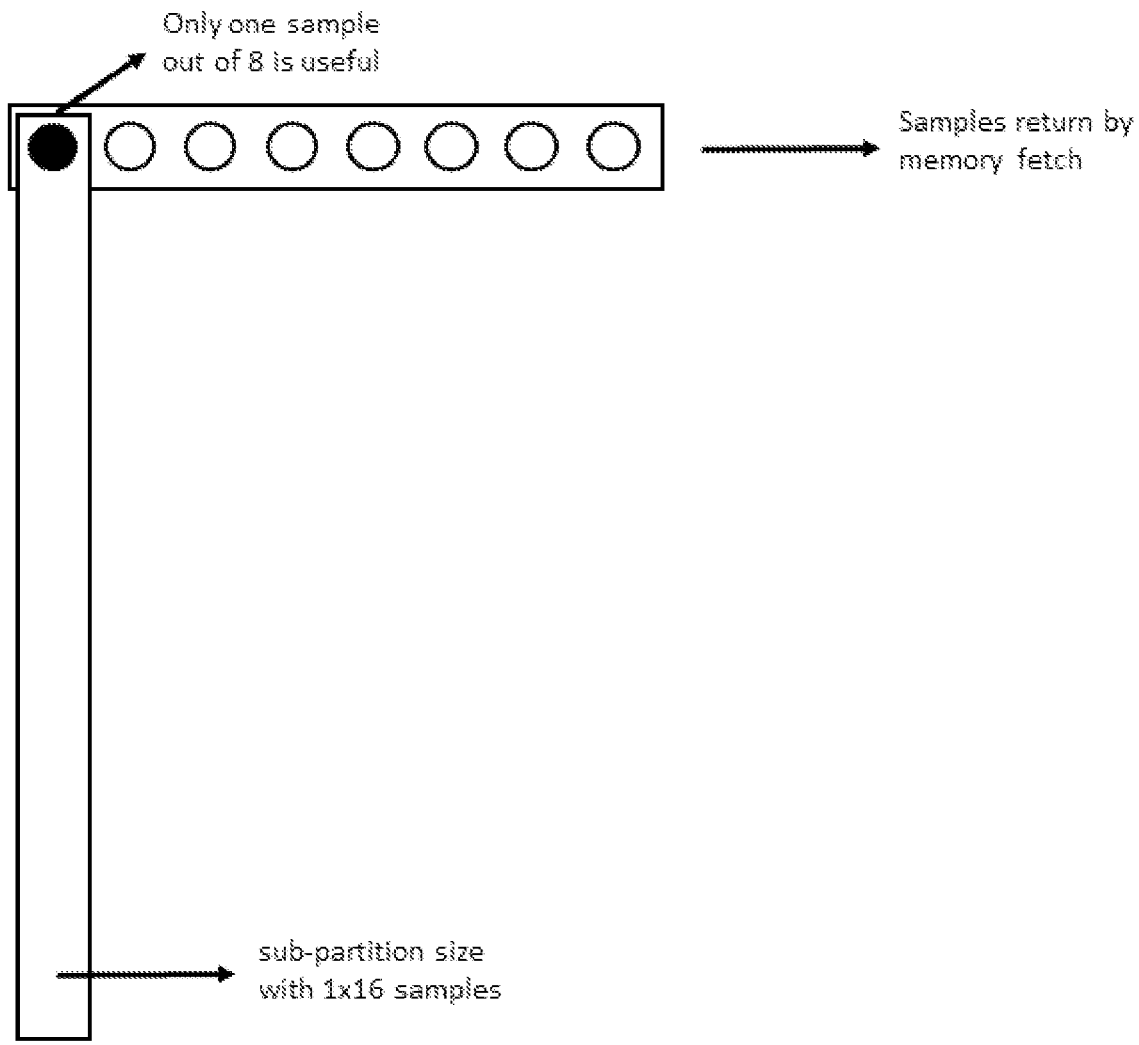
FIG. 9 demonstrates the issue of low data fetch efficiency for a sub-partition size with 1×16 samples.

In hardware, data are generally stored row by row in memory. When data is fetched, the memory will return all data in one row, regardless of how much data in a row is effectively used. The size of the data return in a row is sometimes called memory burst size, and it is usually a number that is a power of two (i.e. 8, 16, etc.). Supposed that samples are fetched in a memory burst size with 8 samples, a block size with 1×16 would require 16 memory fetches, while in each fetch only 1 sample out of 8 is effectively used, as shown in FIG. 9. The figure shows the sample that is used as a filled circle while the samples that are not used are shown as empty circles. As a consequence, a block with size 1×16 will only effectively use ⅛ (i.e. 12.5%) of the available memory bandwidth. When the memory burst size is larger (e. g. N>8), the ratio of effectively used memory bandwidth to available memory bandwidth will be even lower.

For other small blocks such as 16×1 or 8×2, although memory access wise, they are efficient since samples are consecutively stored in a row, there may be adaptation required for other coding schemes. One example of such an adaptation is residual coefficients coding. In residual coefficients coding, the syntax coded_sub_block_flag is signaled at the granularity of the 4×4 sub-block level. With the new introduction of ISP division, the signaling of the syntax coded_sub_block_flag is employed to support sub-blocks as shown in Table 2. Such adaptation might not be affordable for the hardware, provided its achieved coding gain is small.

TABLE 1

Number of sub-partitions depending on the block size

| Block size | Number of sub-partitions |
| --- | --- |
| 4 × 4 | Not divided |
| 4 × 8 and 8 × 4 | 2 |
| All other cases | 4 |

TABLE 2

Entropy coding coefficient group sizes

| Block size | Coefficient group Size |
| --- | --- |
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

The present disclosure provides a method and apparatus for overcoming the above-described hardware and coding problems.

In particular, partitioning rules are provided that are used to determine the number of sub-partitions and the partitioning direction or directions based on a size of the current block that is to be partitioned. The block size may be received by the partitioning unit in the form of block size information.

According to an aspect of the present disclosure, the respective partitioning rule may disable partitioning resulting in sub-partitions with a size of 1×N (N>=16) or 2×M (M>=8). This rule may provide a better use of the memory bandwidth.

The partitioning rule may further disable partitioning resulting in sub-partitions with a size of N×1 (N>=16) or M×2 (M>=8). This rule may provide an improvement in terms of syntax signaling.

In addition to purely horizontal and purely vertical partitioning, the partitioning rules according to the present disclosure further provide a combined horizontal plus vertical partitioning scheme.

In all partitioning rules according to the present disclosure, each sub-partition contains at least 16 samples.

Embodiment 1

According to this embodiment, when ISP mode is enabled, partitioning resulting in sub-partitions with a size of 1×N (N>=16) or 2×M (M>=8) is disabled. Meanwhile, as in ISP, each sub-partition contains at least 16 samples. The new partitioning rule is presented in Table 3:

TABLE 3

Partitioning rule for embodiment 1

| Block size | Number of sub-partitions | Partitioning direction |
|---|---|---|
| 4 × 4 | Not divided | |
| 4 × 8 | 2 | Only horizontal partition, i.e. 2 4 × 4 sub-partitions |
| 4 × N (N > 8) | 4 | Only horizontal partitioning |
| 8 × 4 | 2 | Horizontal or vertical partitioning |
| 8 × N (N > 4) | 4 | Only horizontal partitioning |
| All other cases allowed in ISP | 4 | Horizontal or vertical partitioning |

In one example, the sub-partition may be a prediction block or a transform block.

In one example, at the decoding side, when the sub-partition is a prediction block, a partitioning rule for coding blocks with ISP enabled may be applied as follows:

The intra_subpartitions_split_flag[x0][y0] specifies whether the ISPs split type is horizontal or vertical. When intra_subpartitions_split_flag[x0][y0] is not present, it is inferred as follows.

If cbHeight is greater than MaxTbSizeY, intra_subpartitions_split_flag[x0][y0] is inferred to be equal to 0.

Otherwise (cbWidth is greater than MaxTbSizeY), intra_subpartitions_split_flag[x0][y0] is inferred to be equal to 1.

The variable IntraSubPartitionsSplitType specifies the type of split used for the current luma coding block as illustrated in Table 4. IntraSubPartitionsSplitType is derived as follows:

If intra_subpartitions_mode_flag[x0][y0] is equal to 0, IntraSubPartitionsSplitType is set equal to 0.

Otherwise, the IntraSubPartitionsSplitType is set equal to 1+intra_subpartitions_split_flag[x0][y0].

TABLE 4

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block sub-partitions, also called sub-block in the following, into which an intra luma coding block is divided. NumIntraSubPartitions is derived as follows.

If IntraSubPartitionsSplitType is equal to ISP_NO_SPLIT, NumIntraSubPartitions is set equal to 1.

Otherwise, if one of the following conditions is true, NumIntraSubPartitions is set equal to 2: cbWidth is equal to 4 and cbHeight is equal to 8, cbWidth is equal to 8 and cbHeight is equal to 4.

Otherwise, NumIntraSubPartitions is set equal to 4.

In other words, when ISP is enabled, a flag intra_subpartitions_split_flag is derived from the bitstream. It specifies whether the ISPs split type is horizontal or vertical. If the value of intra_subpartitions_split_flag is equal to 0, it represents the split direction is horizontal, otherwise, the split direction is vertical.

Furthermore, a number of sub-blocks (may not be a prediction block, to avoid confusion, here the term sub-block is used to distinguish a sub-block from a sub-partition, which is a prediction block in this example) is determined. When the coding block size is 8×4 or 4×8, only 2 sub-blocks are allowed. Otherwise, 4 sub-blocks are allowed.

The partitioning rule may be applied when performing intra prediction, before which the following pre-processing may be performed, in order to make sure that the width of the sub-partition is greater than or equal to 4 luma samples.

The variables nW, nH, nPbW, pbFactor, xPartInc and yPartInc are derived as follows:

```
nW = IntraSubPartitionsSplitType    == ISP_VER_SPLIT ?
nTbW / NumIntraSubPartitions : nTbW
nH = IntraSubPartitionsSplitType    == ISP_HOR_SPLIT ?
nTbH / NumIntraSubPartitions : nTbH
        xPartInc = ISP_VER_SPLIT ? 1 : 0
        yPartInc = ISP_HOR_SPLIT ? 1 : 0
        nPbW = Max( 4 , nW )
        pbFactor = nPbW / nW.
```

For i=0 . . . NumIntraSubPartitions−1, the following applies:

The variables xPartIdx, yPartIdx, and xPartPbIdx are derived as follows:

xPartIdx=i*xPartInc, yPartIdx=i*yPartInc, and xPartPbIdx=xPartIdx % pbFactor.

When controlPara is not equal to 1 and xPartPbIdx is equal to 0, the intra sample prediction process as specified in clause 8.4.5.2 of the document JVET-P2001-vE of VVC (Draft 7) is invoked with the location (xTbCmp, yTbCmp) set equal to (xTb0+nW*xPartIdx, yTb0+nH*yPartIdx), the intra prediction mode predModeIntra, the transform block width nTbW and height nTbH set equal to nPbW and nH, the coding block width nCbW and height nCbH set equal to nTbW and nTbH, and the variable cIdx as inputs, and the output is an (nPbW)×(nH) array predSamples.

The nTbW and the nThH represent the width and height of the current coding block. When the split direction (IntraSubPartitionsSplitType) is equal to vertical (ISP_VER_SPLIT) or horizontal (ISP_HOR_SPLIT), a new width (nW) or height (nH) is derived by dividing the original width or height by the number of sub-blocks (NumIntraSubPartitions).

Furthermore, an increment variable in horizontal (i.e. xPartInc) and vertical direction (i.e. yPartInc) is derived based on ISP partition directions. Afterwards, a width restricted variable nPbW is derived whose value is ensured to be greater than or equal to 4. Finally, a prediction block factor value is derived. When the new width nW is larger than or equal to 4, then pbFactor variable would be 1. Otherwise, it may be equal to 2 when the width of the sub-block is equal to 2, and it may be equal to 4 when the width of the sub-block is equal to 1.

The decoder further determines from which sub-block it can perform intra prediction. It iterates over the sub-blocks in the current coding block and derives its prediction block's top left coordinates (xTb0+nW*xPartIdx, yTb0+nH*yPartIdx) as the input to an intra prediction process. However, the width of prediction sub-partition is restricted by the variable xPartPbIdx. Because only when xPartPbIdx is equal to 0, the intra prediction process would be invoked. For example, considering a coding block with size 8×8 with vertical split direction, the following may apply:

nW=2,
nH=8,
xPartInc=1,
xPartInc=0,
nPbW=4, and
pbFactor=2, that is, only when decoder iterates to the $0^{th}$ sub-block and $2^{nd}$ sub-block, then the intra prediction process can be invoked, since by then, their xPartIdx%2 equals to 0. When the intra prediction process is invoked, the width parameter nPbW is equal to 4.

A similar example can be formulated when nW=1.

In this way, the width of the prediction sub-partition is assured to be at least 4 luma samples, which can perfectly alleviate the disadvantage brought by a restriction that a dependence of 1×N/2×N sub-partition prediction on the reconstructed values of previously decoded 1×N/2×N sub-partition of the coding block is not allowed. Meanwhile, the bandwidth of the hardware can be fully used to improve the overall coding performance.

Embodiment 2

According to this embodiment, when ISP mode is enabled, partitioning resulting in sub-partitions with a size of 1×N (N>=16) or 2×M (M>=8) or N×1 (N>=16) or M×2 (M>=8) is disabled. Meanwhile, as in ISP, each sub-partition contains at least 16 samples. The new partitioning rule is presented in Table 5:

TABLE 5

Partitioning rule for embodiment 2

| Block size | Number of sub-partitions | Partitioning direction |
|---|---|---|
| 4 × 4 | Not divided | |
| 4 × 8 | 2 | Only horizontal partitioning, i.e. 2 4 × 4 sub-partitions |

TABLE 5-continued

Partitioning rule for embodiment 2

| Block size | Number of sub-partitions | Partitioning direction |
|---|---|---|
| 4 × N (N > 8) | 4 | Only horizontal partitioning |
| 8 × 4 | 2 | Only vertical partitioning |
| 8 × 8 | Not divided | |
| 8 × N (N > 8) | 4 | Only horizontal partitioning |
| 16 × 4 | 4 | Only vertical partitioning |
| 16 × 8 | 4 | Only vertical partitioning |
| All other cases allowed in ISP | 4 | Horizontal or vertical partitioning |

Embodiment 3

Figure 10:
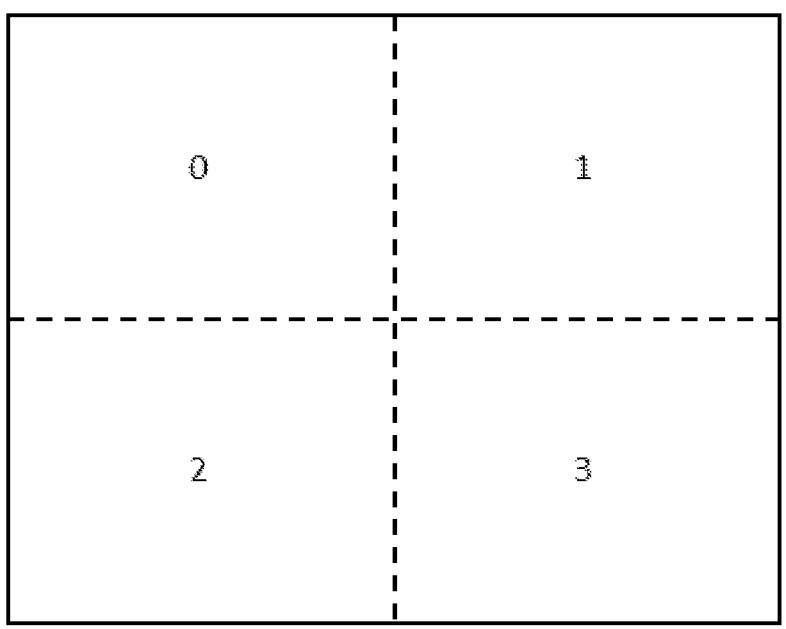
FIG. 10 shows the combined horizontal plus vertical partitioning scheme according to an embodiment of the disclosure.

According to this embodiment, when ISP mode is enabled, partitioning resulting in sub-partitions with a size of 1×N (N>=16) or 2×M (M>=8) or N×1 (N>=16) or M×2 (M>=8) is disabled. Meanwhile, as in ISP, each sub-partition contains at least 16 samples. In addition, a third partitioning scheme is allowed that uses horizontal plus vertical partitioning, as shown in FIG. 10. The figure shows the combined horizontal plus vertical partitioning scheme according to the present embodiment. In addition, the processing order for the sub-partitions is indicated by the numbers in the figure. The new partitioning rule is presented in Table 6:

TABLE 6

Partitioning rule for embodiment 3

| Block size | Number of sub-partitions | Partitioning direction(s) |
|---|---|---|
| 4 × 4 | Not divided | |
| 4 × 8 | 2 | Only horizontal partitioning, i.e. 2 4 × 4 sub-partitions |
| 4 × N (N > 8) | 4 | Only horizontal partitioning |
| 8 × 4 | 2 | Only vertical partitioning |
| 8 × 8 | 4 | New partitioning scheme resulting in 4 4 × 4 blocks |
| 8 × N (N > 8) | 4 | Only horizontal partitioning |
| 16 × 4 | 4 | Only vertical partitioning |
| 16 × 8 | 4 | Only vertical partitioning |
| All other cases allowed in ISP | 4 | Allow horizontal, vertical, and horizontal plus vertical partitioning |

Embodiment 4

According to this embodiment, when ISP mode is enabled, partitioning resulting in sub-partitions with a size of 1×N (N>=16) or 2×M (M>=8) or N×1 (N>=16) or M×2 (M>=8) is disabled. Meanwhile, as in ISP, each sub-partition contains at least 16 samples. In addition, a third partitioning scheme is allowed that uses horizontal plus vertical partitioning for 8×8 blocks only. The combined horizontal plus vertical partitioning is shown in FIG. 10. The new partitioning rule is presented in Table 7:

TABLE 7

Partitioning rule for embodiment 4

| Block size | Number of sub-partitions | Partitioning direction(s) |
|---|---|---|
| 4 × 4 | Not divided | |
| 4 × 8 | 2 | Only horizontal partitioning, i.e. 2 4 × 4 sub-partitions |

TABLE 7-continued

Partitioning rule for embodiment 4

| Block size | Number of sub-partitions | Partitioning direction(s) |
|---|---|---|
| 4 × N (N > 8) | 4 | Only horizontal partitioning |
| 8 × 4 | 2 | Only vertical partitioning |
| 8 × 8 | 4 | New partitioning scheme resulting in 4 4 × 4 blocks |
| 8 × N (N > 8) | 4 | Only horizontal partitioning |
| 16 × 4 | 4 | Only vertical partitioning |
| 16 × 8 | 4 | Only vertical partitioning |
| All other cases allowed in ISP | 4 | Horizontal or vertical partitioning |

The new partitioning rules may improve the usage of the available memory bandwidth as well as the syntax signaling.

Figure 11:
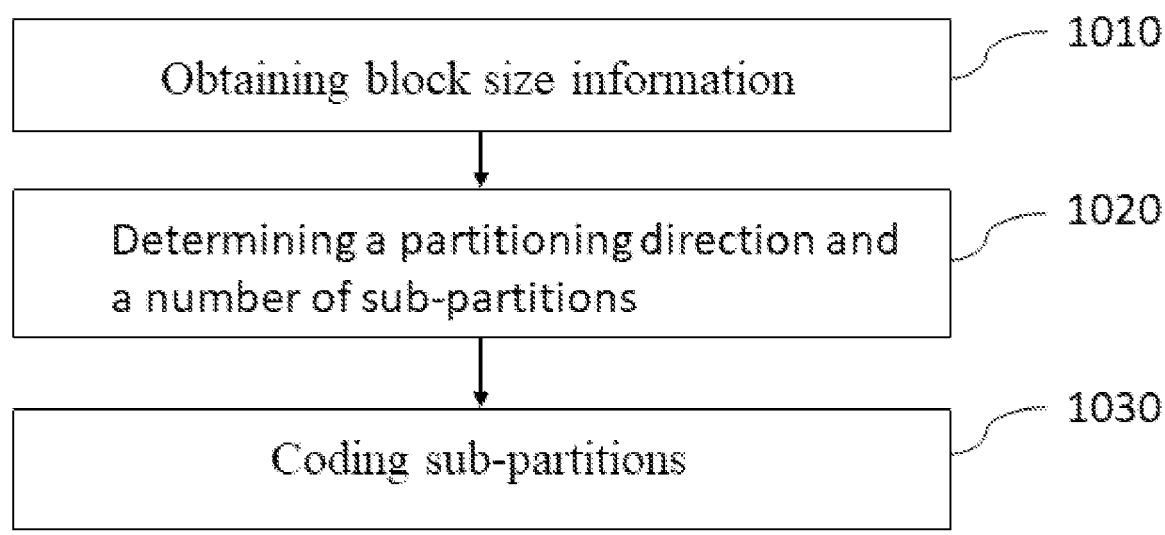
FIG. 11 shows a flowchart for a method of video coding according to an embodiment of the disclosure.

FIG. 11 shows a flowchart for a method of video coding according to an embodiment of the disclosure. In step 1010, block size information of a current block is obtained. In step 1020, a partitioning direction, by which the current block is partitioned into a number of sub-partitions which are used for intra prediction separately with a width of each of the sub-partitions bigger than or equal to 4 or collaboratively by combining at least two of the sub-partitions with a combined width of the at least two sub-partitions bigger than or equal to 4, and the number of sub-partitions is determined, based on the block size information. In step 1030 finally, sub-partitions of the current block are coded, wherein the coding includes decoding or encoding.

Taking the decoding process as an example, a general signal reconstruction process may be implemented in following way. For each sub-partition, reconstructed samples are obtained by adding a residual signal to a prediction signal. Here, the residual signal is generated by the processes such as entropy decoding, inverse quantization and inverse transform. Therefore, the reconstructed sample values of each sub-partition are available to generate the prediction of the next sub-partition, and each sub-partition is processed repeatedly. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. All sub-partitions share the same intra mode, In ISP mode, all 67 intra modes are allowed. Position dependent intra prediction combination (PDPC) is also applied if corresponding width and height is at least 4 samples long. In addition, the condition for intra interpolation filter selection does not exist anymore, and Cubic (DCT-IF) filter is always applied for fractional position interpolation in ISP mode.

Figure 12:
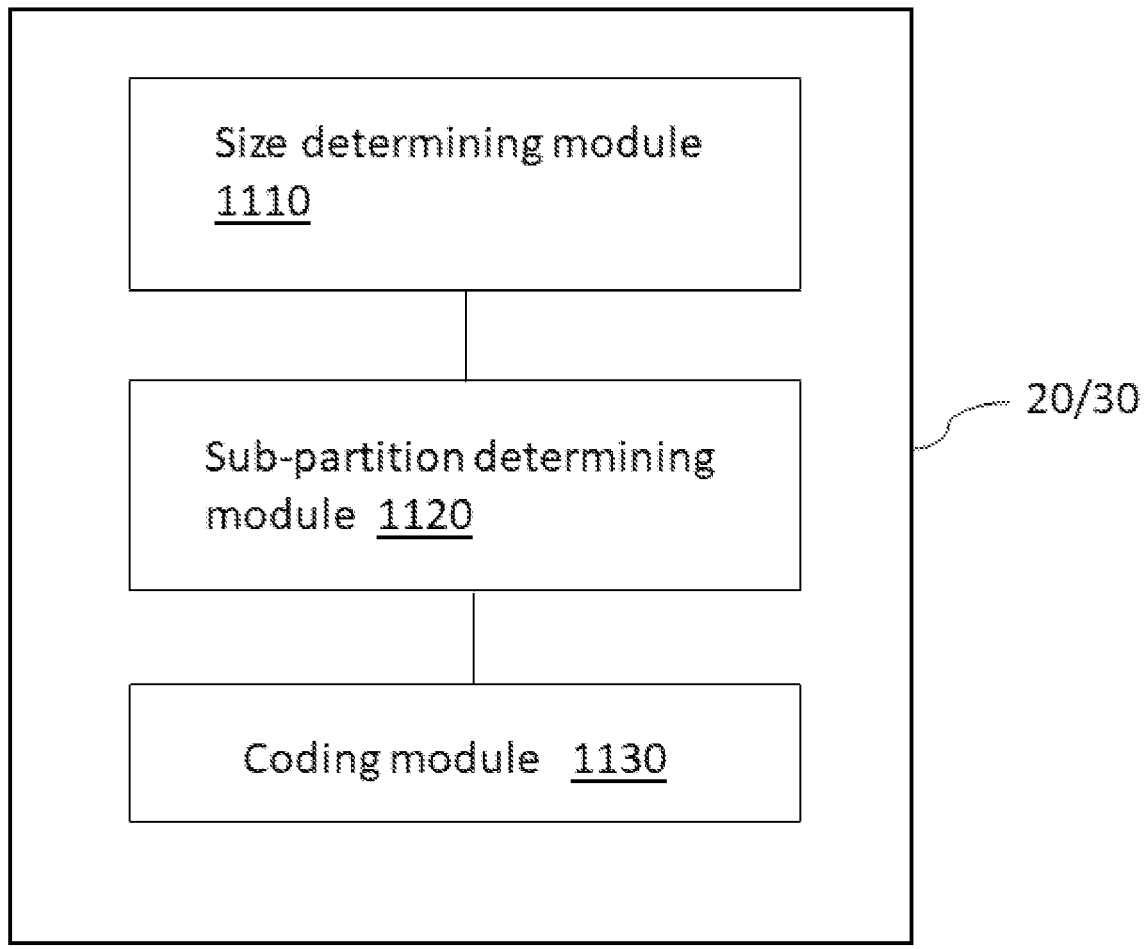
FIG. 12 shows a block diagram illustrating an example of an encoding apparatus or a decoding apparatus according to embodiments of the disclosure.

FIG. 12 shows a block diagram illustrating an example of an encoding apparatus 20 or a decoding apparatus 30 according to embodiments of the disclosure. The encoding or decoding apparatus comprises a size determining module 1110 configured to obtain block size information of a current block, a sub-partition determining module 1120 configured to determine a partitioning direction, by which the current block is partitioned into a number of sub-partitions which are used for intra prediction separately with a width of each of the sub-partitions bigger than or equal to 4 or collaboratively by combining at least two of the sub-partitions with a combined width of the at least two sub-partitions bigger than or equal to 4, and the number of sub-partitions, based on the block size information, and a coding module 1130 configured to encode sub-partitions of the current block.

The size determining module 1110, the sub-partition determining module 1120 and the coding module 1130 may be implemented in hardware, software, firmware, or any combination thereof. If implemented in software, the functions may be stored on a computer-readable medium or transmitted over communication media as one or more instructions or code and executed by a hardware-based processing unit. Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

Mathematical Operators:

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, i.e. "the first" is equivalent to the 0-th, "the second" is equivalent to the 1st, etc.

Arithmetic Operators:

The following arithmetic operators are defined as follows:

| | |
|---|---|
| + | Addition |
| − | Subtraction (as a two-argument operator) or negation (as a unary prefix operator) |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7/4 and −7/−4 are truncated to 1 and −7/4 and 7/−4 are truncated to −1. |
| ÷ | Used to denote division in mathematical equations where no truncation or rounding is intended. |
| $\dfrac{x}{y}$ | Used to denote division in mathematical equations where no truncation or rounding is intended. |
| $\sum_{i=x}^{y} f(i)$ | The summation of f(i) with i taking all integer values from x up to and including y. |
| x % y | Modulus. Remainder of x divided by y, defined only for integers x and y with x >= 0 and y > 0. |

Logical Operators:

The following logical operators are defined as follows:

x && y Boolean logical "and" of x and y.

x||y Boolean logical "or" of x and y.

! Boolean logical "not".

x?y:z If x is TRUE or not equal to 0, evaluates to the value of y, otherwise, evaluates to the value of z.

Relational Operators:

The following relational operators are defined as follows:

> Greater than.

>= Greater than or equal to.

< Less than.

<= Less than or equal to.

== Equal to.

!= Not equal to.

When a relational operator is applied to a syntax element or variable that has been assigned the value "na" (not applicable), the value "na" is treated as a distinct value for the syntax element or variable. The value "na" is considered not to be equal to any other value.

Bit-Wise Operators:

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ A Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators:

The following arithmetic operators are defined as follows:

= Assignment operator.

++ Increment, i.e., x++ is equivalent to x=x+1, when used in an array index, evaluates to the value of the variable prior to the increment operation.

−− Decrement, i.e., x−− is equivalent to x=x−1, when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation:

The following notation is used to specify a range of values:

x=y . . . z x takes on integer values starting from y to z, inclusive, with x, y, and z being integer numbers and z being greater than y.

Mathematical Functions:

The following mathematical functions are defined:

$$Abs(x) = \begin{cases} x; & x >= 0 \\ -x; & x < 0 \end{cases}$$

Asin(x) the trigonometric inverse sine function, operating on an argument x that is in the range of −1.0 to 1.0, inclusive, with an output value in the range of −π÷2 to π÷2, inclusive, in units of radians.

Atan(x) the trigonometric inverse tangent function, operating on an argument x, with an output value in the range of −π÷2 to π÷2, inclusive, in units of radians.

$$Atan2(y, x) = \begin{cases} Atan\left(\frac{y}{x}\right); & x > 0 \\ Atan\left(\frac{y}{x}\right) + \pi; & x < 0 \;\&\&\; y >= 0 \\ Atan\left(\frac{y}{x}\right) - \pi; & x < 0 \;\&\&\; y < 0 \\ +\frac{\pi}{2}; & x == 0 \;\&\&\; y >= 0 \\ -\frac{\pi}{2}; & \text{otherwise} \end{cases}$$

Ceil(x) the smallest integer greater than or equal to x.

$$Clip1_Y(x) = Clip3(0, (1 \ll BitDepth_Y) - 1, x).$$

$$Clip1_C(x) = Clip3(0, (1 \ll BitDepth_C) - 1, x).$$

$$Clip3(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$Min(x, y) = \begin{cases} x; & x <= y \\ y; & x > y \end{cases}.$$

$$Max(x, y) = \begin{cases} x; & x >= y \\ y; & x < y \end{cases}.$$

$$Round(x) = Sign(x)*Floor(Abs(x) + 0.5).$$

$$Sign(x) = \begin{cases} 1; & x > 0 \\ 0; & x == 0. \\ -1; & x < 0 \end{cases}$$

Sin(x) the trigonometric sine function operating on an argument x in units of radians.

$$Sqrt(x) = \sqrt{x}.$$

$$Swap(x, y) = (y, x).$$

Tan(x) the trigonometric tangent function operating on an argument x in units of radians.

Order of operation precedence.

When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest, a higher position in the table indicates a higher precedence.

For those operators that are also used in the C programming language, the order of precedence used in this Specification is the same as used in the C programming language.

TABLE 8

Operation precedence from highest (at top of table) to lowest (at bottom of table)

operations (with operands x, y, and z)
"x++", "x− −"
"!x", "−x" (as a unary prefix operator)
$x^y$
"x * y", "x / y", x ÷ y", "$\frac{x}{y}$", "x % y"

TABLE 8-continued

Operation precedence from highest (at top of table) to lowest (at bottom of table)

"x + y", "x − y" (as a two-argument operator),

"$\sum_{i=x}^{y} f(i)$"

"x << y", "x >> y"
"< y", "x <= y", "x > y", "x >= y"
"x = = y", "x != y"
"x & y"
"x | y"
"x && y"
"x || y"
"x ? y : z"
"x..y"
"x = y", "x += y", "x −= y"

Text Description of Logical Operations:

In the text, a statement of logical operations as would be described mathematically in the following form:

if( condition 0 )
    statement 0
else if( condition 1 )
    statement 1
...
else /* informative remark on remaining condition */
    statement n
may be described in the following manner:
... as follows / ... the following applies:
    If condition 0, statement 0
    Otherwise, if condition 1, statement 1
...
    Otherwise (informative remark on remaining condition), statement n Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " may always be an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

if( condition 0a && condition 0b )
    statement 0
else if( condition 1a | | condition 1b )
    statement 1
...
else
    statement n
may be described in the following manner:
    ... as follows / ... the following applies:
    If all of the following conditions are true, statement 0:
        condition 0a
        condition 0b
    Otherwise, if one or more of the following conditions are true, statement 1:
        condition 1a
        condition 1b
...
    Otherwise, statement n In the text, a statement of logical operations as would be described mathematically in the following form:

if( condition 0 )
    statement 0
if( condition 1 )
    statement 1
may be described in the following manner:
    When condition 0, statement 0
    When condition 1, statement 1

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (or tools or technologies) of the video encoder 20 and the video decoder 30 may equally be used for still picture processing, e.g. residual calculation 204/304, transform 206, quantization 208, inverse quantization 210/310, (inverse) transform 212/312, partitioning 262, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which correspond to tangible media such as data storage media, or communication media including any medium that facilitates transfer of a computer program from one place to another, e.g., according to a communication protocol. In this manner, computer-readable media generally may correspond to (1) tangible computer-readable storage media which are non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, electrically erasable programmable ROM (EEPROM), compact disc (CD) ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, include CD, laser disc, optical disc, DVD, floppy disk and BLU-RAY DISC, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method of video coding, wherein the method comprises:
    obtaining block size information of a current block;
    determining a partitioning direction based on the block size information;
    determining, based on the block size information, a number of sub-partitions to which the current block is to be partitioned in the partitioning direction, wherein the sub-partitions are for intra prediction, wherein each of the sub-partitions comprises 16 samples;
    partitioning the current block into sub-partitions for intra prediction, wherein the partitioning direction is based on the block size information, wherein the number of sub-partitions to which the current block is to be partitioned is based on the block size information;
    performing, by separate intra prediction of the sub-partitions, the intra prediction of the sub-partitions when a width of each of the sub-partitions is greater than or equal to 4 samples;
    performing, by collaborative intra prediction of the sub-partitions, the intra prediction of the current block by combining at least two sub-partitions of the sub-partitions when the at least two sub-partitions have a width less than 4 samples and a combined width of the at least two sub-partitions is greater than or equal to 4 samples; and
    coding the sub-partitions.

2. The method of claim 1, further comprising coding the current block using an intra sub-partition (ISP) coding mode.

3. The method of claim 1, further comprising partitioning the current block into the sub-partitions according to the number of the sub-partitions and the partitioning direction.

4. The method of claim 1, wherein the number is 1 when a block size of the current block is 4×4, 2 when the block size is 4×8 or 8×4, and 4 when the block size is another size.

5. The method of claim 1, wherein the partitioning direction is either horizontal or vertical.

6. The method of claim 1, wherein the partitioning direction is horizontal partitioning when a block size of the current block is 4×8, wherein the partitioning direction is the horizontal partitioning when the block size is 4×N1 or 8×N2, wherein N1>8, and wherein N2>4.

7. The method of claim 6, wherein the number is 1 and does not comprise the partitioning direction when the block size is 4×4, wherein the number is 2 and the partitioning direction is either horizontal partitioning or vertical partitioning when the block size is 8×4, and wherein the number is 4 and the partitioning direction is either the horizontal partitioning or the vertical partitioning when the block size is another size.

8. The method of claim 1, wherein the partitioning direction is horizontal partitioning and the number is 2 when a block size of the current block is 4×8, wherein the partitioning direction is the horizontal partitioning and the number is 4 when the block size is 4×N1 or 8×N2, wherein N1>8, and wherein N2>4.

9. The method of claim 1, further comprising:
coding the partitioning direction into a first bitstream that comprises coded data of the current block when encoding; and
parsing, from a second bitstream that comprises the coded data and information on the partitioning direction, the partitioning direction when decoding.

10. The method of the claim 1, wherein the sub-partitions are intra prediction blocks.

11. An encoder comprising:
a memory configured to store instructions; and
a processor coupled to the memory, wherein the instructions cause the processor to be configured to:
obtain block size information of a current block;
determine a partitioning direction based on the block size information;
determine, based on the block size information, a number of sub-partitions to which the current block is to be partitioned in the partitioning direction, wherein the sub-partitions are for intra prediction;
partition the current block into sub-partitions for intra prediction, wherein the partitioning direction is based on the block size information, wherein the number of sub-partitions to which the current block is to be partitioned is based on the block size information;
perform, by separate intra prediction of the sub-partitions, the intra prediction of the sub-partitions when a width of each of the sub-partitions is greater than or equal to 4 samples;
perform, by collaborative intra prediction of the sub-partitions, the intra prediction of the current block by combining at least two sub-partitions of the sub-partitions when the at least two sub-partitions have a width less than 4 samples and a combined width of the at least two sub-partitions is greater than or equal to 4 samples; and
encode the sub-partitions.

12. The encoder of claim 11, wherein the partitioning direction is horizontal partitioning when a block size of the current block is 4×8, wherein the partitioning direction is the horizontal partitioning when the block size is 4×N1 or 8×N2, wherein N1>8, and wherein N2>4.

13. The encoder of claim 12, wherein the number is 1 and does not comprise the partitioning direction when the block size is 4×4, wherein the number is 2 and the partitioning direction is either horizontal partitioning or vertical partitioning when the block size is 8×4, and wherein the number is 4 and the partitioning direction is either the horizontal partitioning or the vertical partitioning when the block size is another size.

14. The encoder of claim 11, wherein the partitioning direction is horizontal partitioning and the number is 2 when a block size of the current block is 4×8, wherein the partitioning direction is the horizontal partitioning and the number is 4 when the block size is 4×N1 or 8×N2, wherein N1>8, and wherein N2>4.

15. The encoder of claim 11, wherein the instructions further cause the processor to be configured to encode information on the partitioning direction into a bitstream that comprises coded data.

16. The encoder of claim 11, wherein the instructions further cause the processor to be configured to code the current block using an intra sub-partition (ISP) coding mode.

17. The encoder of claim 11, wherein the instructions further cause the processor to be configured to partition the current block into the sub-partitions according to the number of the sub-partitions and the partitioning direction.

18. The encoder of claim 11, wherein the partitioning direction is either horizontal or vertical.

19. A decoder comprising:
a memory configured to store instructions; and
a processor coupled to the memory, wherein the instructions cause the processor to be configured to:
obtain block size information of a current block;
determine a partitioning direction based on the block size information;
determine, based on the block size information, a number of sub-partitions to which the current block is to be partitioned in the partitioning direction, wherein the sub-partitions are for intra prediction;
partition the current block into sub-partitions for intra prediction, wherein the partitioning direction is based on the block size information, wherein the number of sub-partitions to which the current block is to be partitioned is based on the block size information;
perform, by separate intra prediction of the sub-partitions, the intra prediction of the sub-partitions when a width of each of the sub-partitions is greater than or equal to 4 samples;
perform, by collaborative intra prediction of the sub-partitions, the intra prediction of the current block by combining at least two sub-partitions of the sub-partitions when the at least two sub-partitions have a width less than 4 samples and a combined width of the at least two sub-partitions is greater than or equal to 4 samples; and
decode the sub-partitions.

20. The decoder of claim 19, wherein the partitioning direction is horizontal partitioning when a block size of the current block is 4×8, wherein the partitioning direction is the horizontal partitioning when the block size is 4×N1 or 8×N2, wherein N1>8, and wherein N2>4.

21. The decoder of claim 20, wherein the number is 1 and does not comprise the partitioning direction when the block size is 4×4, wherein the number is 2 and the partitioning direction is either horizontal partitioning or vertical partitioning when the block size is 8×4, and wherein the number is 4 and the partitioning direction is either the horizontal partitioning or the vertical partitioning when the block size is another size.

22. The decoder of claim 19, wherein the partitioning direction is horizontal partitioning and the number is 2 when a block size of the current block is 4×8, wherein the partitioning direction is the horizontal partitioning and the number is 4 when the block size is 4×N1 or 8×N2, wherein N1>8, and wherein N2>4.

* * * * *